(12) United States Patent
Tsujino et al.

(10) Patent No.: US 11,933,746 B2
(45) Date of Patent: Mar. 19, 2024

(54) DEVICE FOR HOSTING A PROBE SOLUTION OF MOLECULES IN A PLURALITY OF INDEPENDENT CELLS

(71) Applicant: Paul Scherrer Institut, Villigen PSI (CH)

(72) Inventors: Soichiro Tsujino, Endingen (CH); Takashi Tomizaki, Baden (CH); Michal Kepa, Basel (CH)

(73) Assignee: Paul Scherrer Institut, Villigen PSI (CH)

( * ) Notice: Subject to any disclaimer, the term of this patent is extended or adjusted under 35 U.S.C. 154(b) by 51 days.

(21) Appl. No.: 17/781,098

(22) PCT Filed: Nov. 16, 2020

(86) PCT No.: PCT/EP2020/082185
§ 371 (c)(1),
(2) Date: May 31, 2022

(87) PCT Pub. No.: WO2021/104906
PCT Pub. Date: Jun. 3, 2021

(65) Prior Publication Data
US 2022/0404296 A1    Dec. 22, 2022

(30) Foreign Application Priority Data
Nov. 28, 2019    (EP) .................................... 19212142

(51) Int. Cl.
*G01N 23/20* (2018.01)
*G01N 23/20016* (2018.01)
(Continued)

(52) U.S. Cl.
CPC . *G01N 23/20025* (2013.01); *G01N 23/20016* (2013.01); *G01N 23/205* (2013.01);
(Continued)

(58) Field of Classification Search
CPC ..... G01N 2223/0561; G01N 2223/307; G01N 2223/309; G01N 2223/321;
(Continued)

(56) References Cited

U.S. PATENT DOCUMENTS

| 5,400,741 A | 3/1995 | DeTitta et al. |
|---|---|---|
| 5,419,278 A | 5/1995 | Carter |

(Continued)

FOREIGN PATENT DOCUMENTS

| EP | 1119654 A1 | 8/2001 |
|---|---|---|
| JP | 2002179499 A | 6/2002 |

(Continued)

*Primary Examiner* — Mark R Gaworecki
(74) *Attorney, Agent, or Firm* — Laurence A. Greenberg; Werner H. Stemer; Ralph E. Locher

(57) ABSTRACT

A device to host a crystallization medium, such as a solution, for crystal growth and a system for X-ray diffraction experiments to determine the atomic structure of crystals. A plurality of cells have a well, a sample holder placed in the well. The solution is hosted in the sample holder between thin-plates or one thin-plate. A cap seals an opening to the cell and each sample holder can be extracted independently from each well. A system for automated X-ray diffraction experiments for small crystals in the sample holder extracted from the wells utilizes an ultrasonic acoustic levitator to determine the crystal structure at atomic resolution. X-ray diffraction images are generated by scanning the X-ray beam over the levitated sample holder along a spiral trajectory by rotating the sample holder and moving in the direction perpendicular to the X-ray beam and the rotation axis at the same time.

15 Claims, 16 Drawing Sheets

(51) Int. Cl.
*G01N 23/20025* (2018.01)
*G01N 23/205* (2018.01)

(52) U.S. Cl.
CPC ............ *G01N 2223/0561* (2013.01); *G01N 2223/307* (2013.01); *G01N 2223/309* (2013.01); *G01N 2223/321* (2013.01); *G01N 2223/3306* (2013.01); *G01N 2223/40* (2013.01); *G01N 2223/501* (2013.01); *G01N 2223/602* (2013.01)

(58) Field of Classification Search
CPC ....... G01N 2223/3306; G01N 2223/40; G01N 2223/501; G01N 2223/602; G01N 23/20016; G01N 23/20025; G01N 23/205
See application file for complete search history.

(56) References Cited

U.S. PATENT DOCUMENTS

| | | | |
|---|---|---|---|
| 6,267,935 B1 | 7/2001 | Hol et al. | |
| 2002/0182637 A1 | 12/2002 | Santarsiero et al. | |
| 2007/0202010 A1* | 8/2007 | Talebpour | B01L 3/50853 422/400 |
| 2007/0281359 A1* | 12/2007 | Chait | G01N 35/028 422/245.1 |
| 2008/0050834 A1* | 2/2008 | Pamula | G01N 23/20 436/86 |
| 2020/0256811 A1* | 8/2020 | Thorne | G01N 23/20025 |

FOREIGN PATENT DOCUMENTS

| | | | | |
|---|---|---|---|---|
| WO | WO-2014118778 A1 * | 8/2014 | ............ | C09D 1/00 |
| WO | 2017089069 A1 | 6/2017 | | |

* cited by examiner

A-A'

FIG 7
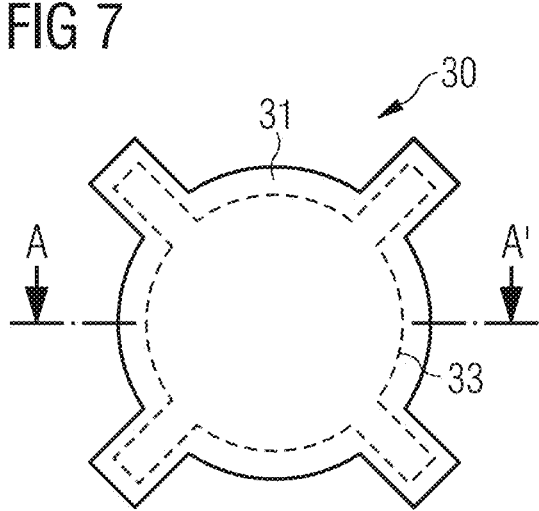
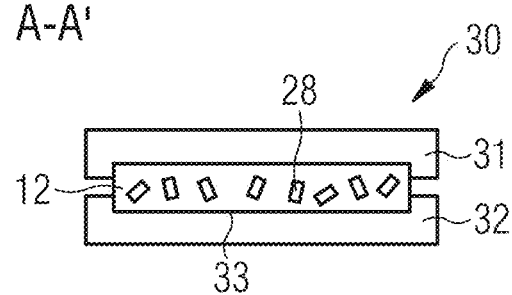
FIG 8
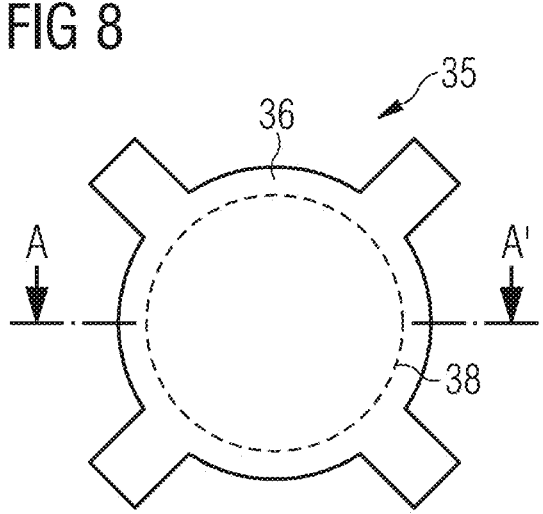
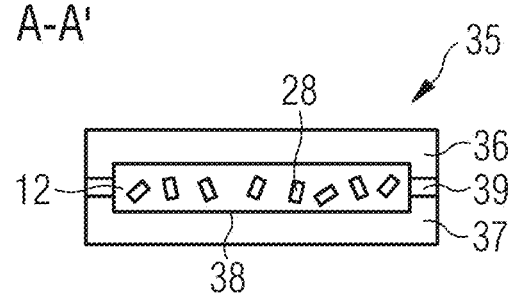

FIG 9
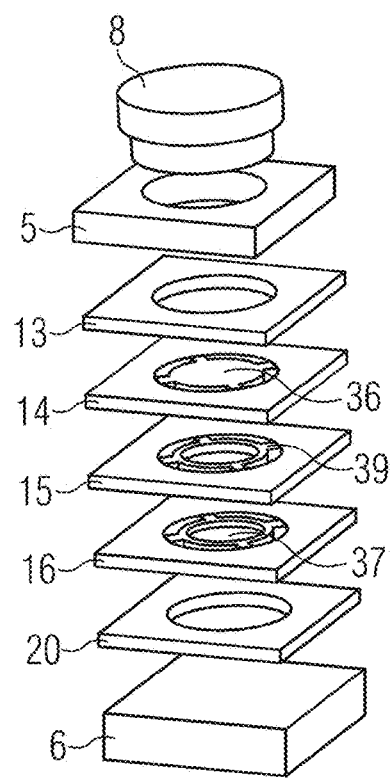
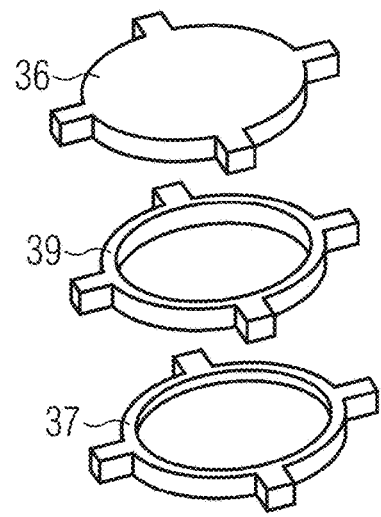
FIG 10
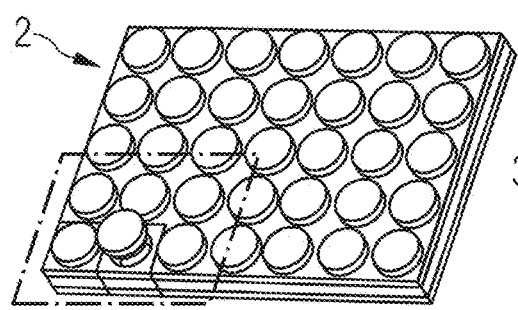
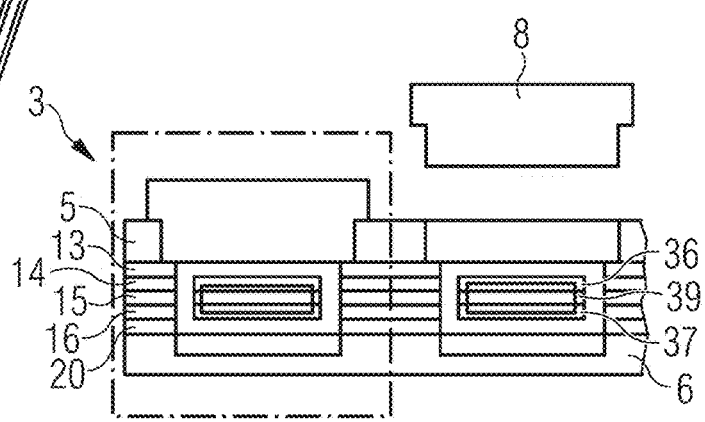
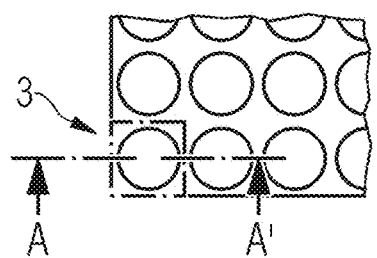

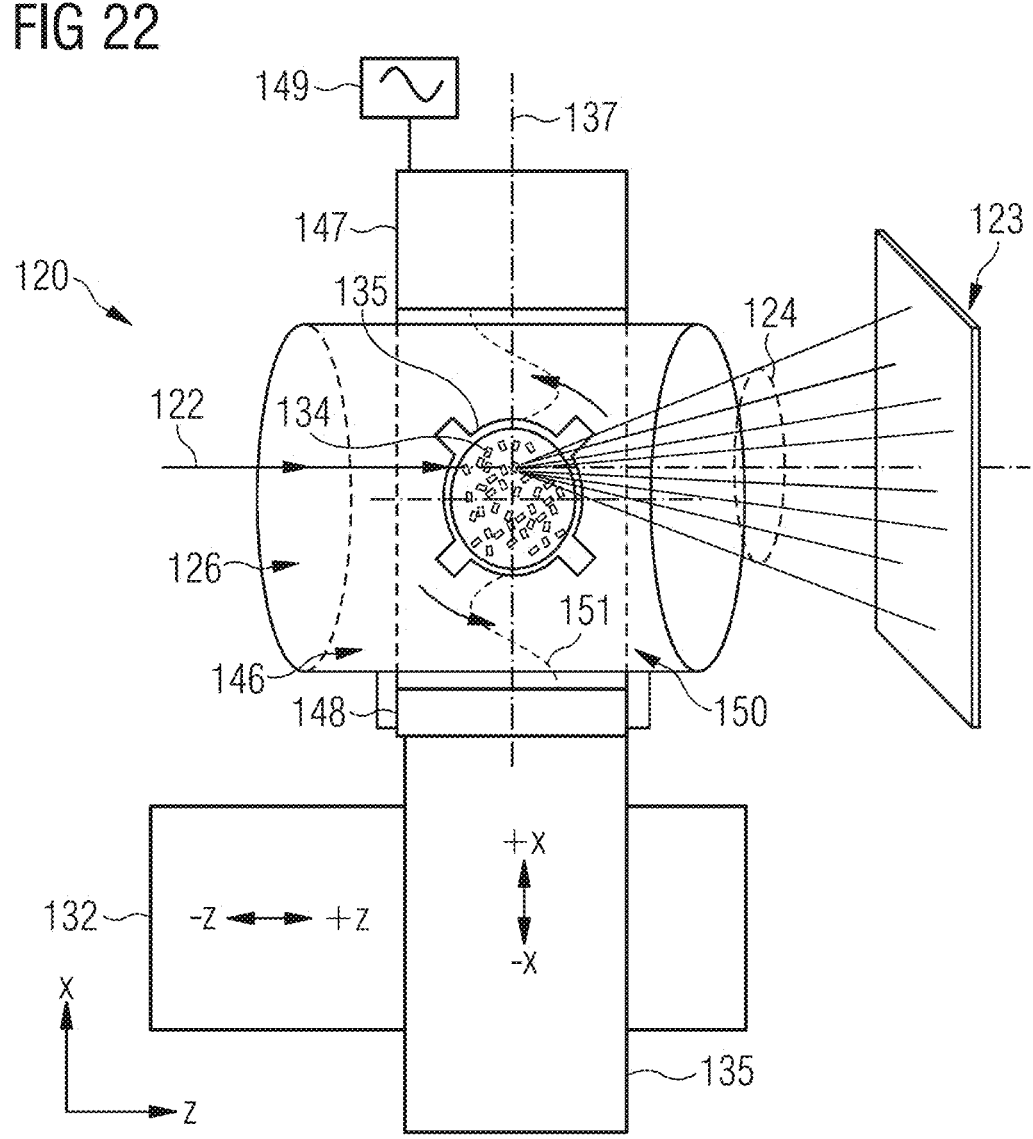

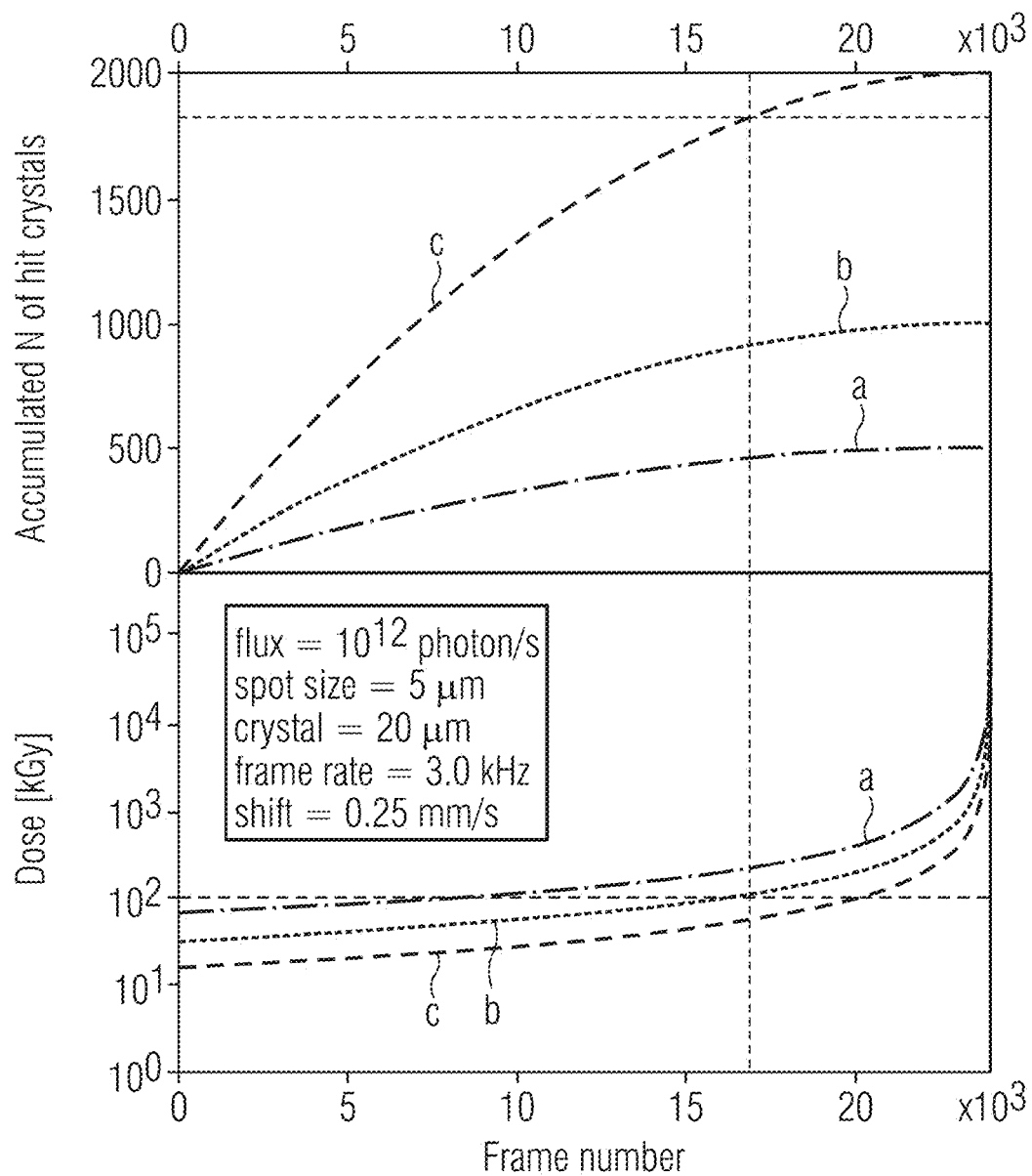

DEVICE FOR HOSTING A PROBE SOLUTION OF MOLECULES IN A PLURALITY OF INDEPENDENT CELLS

FIELD AND BACKGROUND OF THE INVENTION

The present invention is related to a device for hosting a probe solution of molecules in a plurality of independent cells. Further, the present invention relates to a system for X-ray diffraction experiments of (small) crystals to determine the crystal structure at atomic resolution; said crystals are grown in a sample holder extracted from said device.

Sandwich crystallisation methods wherein a solution of molecules mixed in a medium in the meso phase is sandwiched between thin glass plates to grow crystals of molecules in an original setup is known. For the diffraction experiments with crystals grown in the method, one has to extract crystals from the sandwich plate. This includes cutting the glass plates, removing unnecessary crystallisation medium around the crystals and harvesting crystals on a sample holder without overlapping thereon. Considering that this sample preparation should be done in a short time to avoid dry-up of the samples in the medium, the cumbersome prior art methods do not efficiently support these time constraints.

SUMMARY OF THE INVENTION

It is the objective of the present invention to minimise the manual intervention required in the state-of-the-art and to realise an automated pipeline of diffraction experiments for crystals grown in sandwich plates with the viscous crystallisation medium.

This objective is achieved according to the present invention by a device for growing crystals of molecules from a crystallization medium, such as a solution or a fluid, comprising said molecules; said crystals being suitable for X-ray diffraction experiments to solve the structure of the crystal at atomic resolution in a droplet comprising said grown crystals; said droplets being held by a sample holder adapted for a sandwich crystallization method, wherein said device comprising:
  a) a plurality of independent cells provided by an array of wells and a top plate and a bottom plate thereby forming volumes for the sample holders; each well being designed to host a sample holder between the top plate and bottom plate wherein one or both of the top and the bottom plate having openings equipped with removable caps;
  b) stacks of independent cells that are formed by the top plate, a sample holder frame, the bottom plate and spacer layers; optionally adhesive layers are inserted between said layers;
  c) spacer bars in the spacer layers around said sample holders that are connected to the sample holder frames wherein each well is adapted to be in equilibrium with the vapor of the solution in a space above and below the sample holder through the openings between the sample holder and the sample holder frames;
  d) the volume of each well to be adjustable by the thickness of said caps of each well;
  e) said top plate, bottom plate, caps, spacer layers, and optionally the adhesive layers, are made of waterproof material wherein said sample holder is designed as a thin plate with low X-ray scattering; said thin plate preferably made of polyimide or fluorinated polyimide having a thickness in the range from 5 to 50 µm.

With respect to the system this objective is achieved according to the present invention by a system to conduct automated serial crystallography experiments of crystals at room temperature to collect X-ray diffraction images to solve the structure of the crystals at atomic resolution, comprising
  a) an acoustic levitation diffractometer comprising an acoustic levitator and an X-ray source;
  b) a device according to any of the preceding claims having samples of the crystals in the sample holders,
  c) a gonio stage to rotate the axis of the acoustic levitator to an oblique angle with respect to the X-ray beam generated by the X-ray source,
  d) a translation stage to move the acoustic levitator of said acoustic levitation diffractometer in the transverse direction perpendicular to the X-ray beam and the axis of the acoustic levitator,
  e) a mechanism to harvest said sample holders from the device,
  f) wherein a spiral trajectory of a spot of the X-ray beam on the sample holder during the data collection is achieved by a combination of the rotation of the acoustically levitated sample holder in the acoustic levitator and the simultaneous transverse translation of the sample holder with the acoustic levitator; the ultrasonic acoustic pressure of the acoustic levitator is adjusted to set the rotation speed of the sample holder acoustically levitated in the acoustic levitator with its axis oblique to the X-ray beam and wherein the transverse translation speed is set accordingly to adjust the radial separation between the spiral trajectory of the X-ray beam spot on the sample holder with an appropriate X-ray dose on samples at a given X-ray photon flux.

Herewith, an automated pipeline of the diffraction experiments for crystals grown in the viscous crystallisation medium such as the meso phase by the sandwich crystallisation method is realised by the X-ray diffractometer comprising a highly brilliant X-ray beam, a high-frame-rate pixelated X-ray image detector, and an ultrasonic acoustic levitator, and an apparatus for remotely harvesting one of the sample holders containing said crystals grown in the viscous crystallisation medium in the device of the present invention from said device and delivering said sample holder into the X-ray diffractometer. The rotation and the position of the levitated sample holder are controlled to realise the scanning of the X-ray beam over the sample holder in a spiral trajectory.

Further preferred embodiments of the present invention are defined by the attached dependent claims.

BRIEF DESCRIPTION OF THE FIGURES

Preferred embodiments of the present invention are hereinafter described with reference to the attached drawings which depict in:

FIG. 7 schematically an example for a sample holder comprising the first thin-plate, the second thin-plate, and a solution therebetween;

FIG. 8 schematically an example for a sample holder comprising the first thin-plate, the second thin-plate, and a solution therebetween;

FIG. 9 schematically an example of another example for a cell;

FIG. 10 schematically the device in an oblique view (left top panel), the top view of the enclosed cells (left bottom panel), and the cross-section along the plane that goes through the line A-A' of the cells;

FIG. 22 schematically from the top an instrument to conduct X-ray diffraction experiments of small crystals grown in the sample holder levitated and rotated in the acoustic levitator;

FIG. 24 a bottom panel showing the relationship between the estimated dose on small crystals grown in a sample holder as function of the frame number and a top panel showing the accumulated number of small crystals hit by X-ray as the scan proceeds.

DETAILED DESCRIPTION OF THE INVENTION

Figure 1:
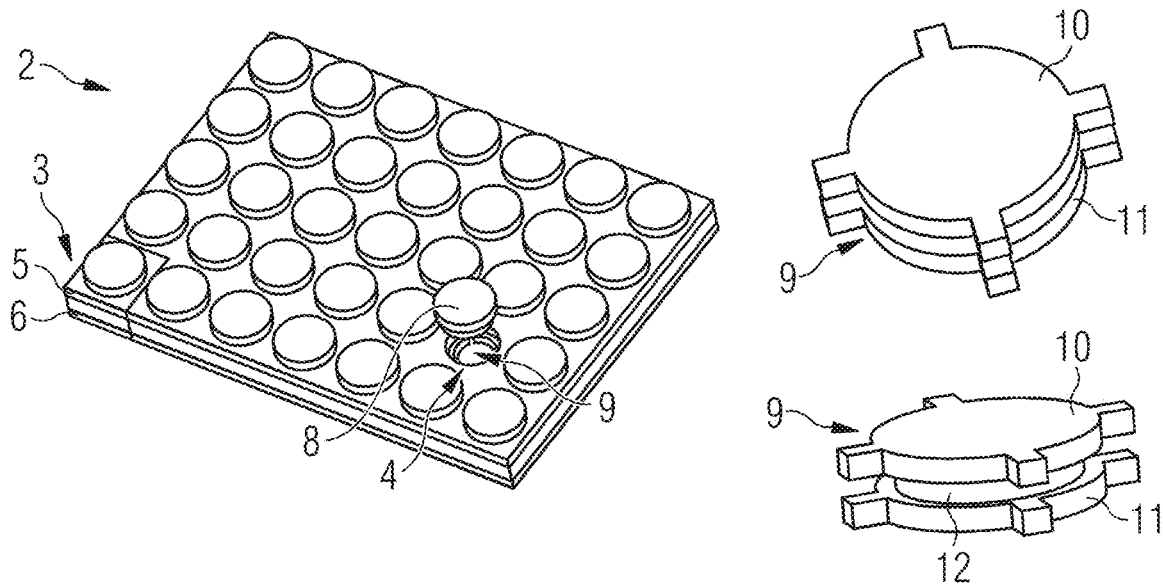
FIG. 1 schematically a device for hosting a solution comprising molecules, said device comprising the plurality of cells; each cell comprising a well and a sample holder for the solution therein.

FIG. 1 schematically shows a device 2 hosting a solution comprising molecules. Said device 2 comprises a plurality of cells 3. In a well 4 of each cell 3, said solution is mixed on one thin-plate 10 or between at least two thin-plates 10, 11 of sample holders 9 to grow crystals 28 of said molecules comprised in the solution. Each well 4 in different cells 3 can be individually opened for soaking ligand solutions after the growing of the crystals 28. Each sample holder 9 in different wells 4 can be individually extracted to determine the atomic structure of the crystals 28 without opening wells 4 of other cells 3.

Figure 2:
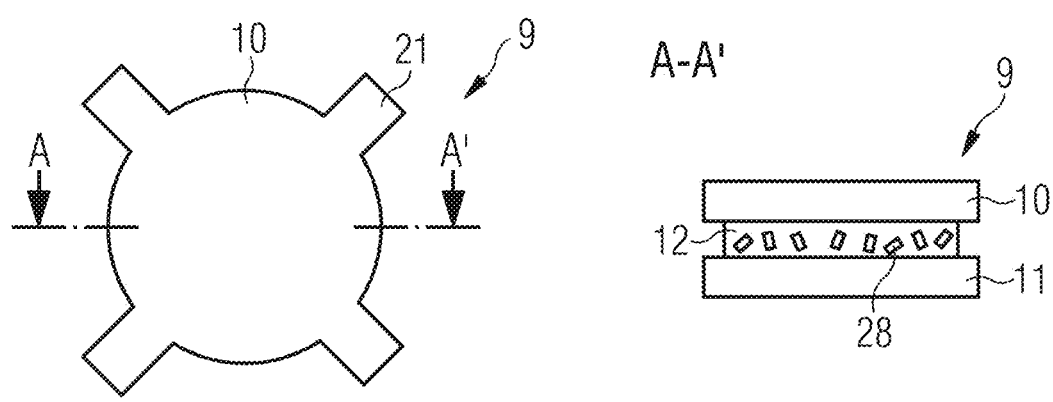
FIG. 2 schematically a sample holder comprising a first thin-plate, a second thin-plate, and a solution therebetween.
Figure 3:
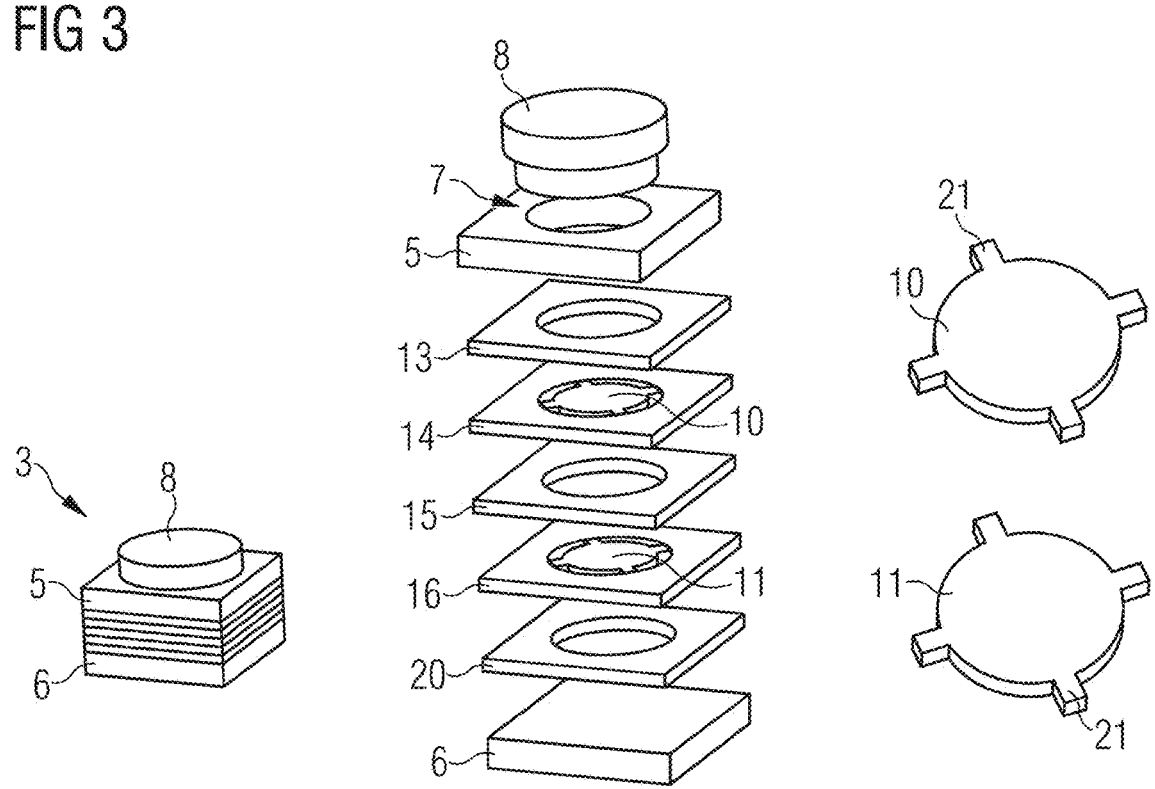
FIG. 3 schematically an example of a cell.
Figure 4:
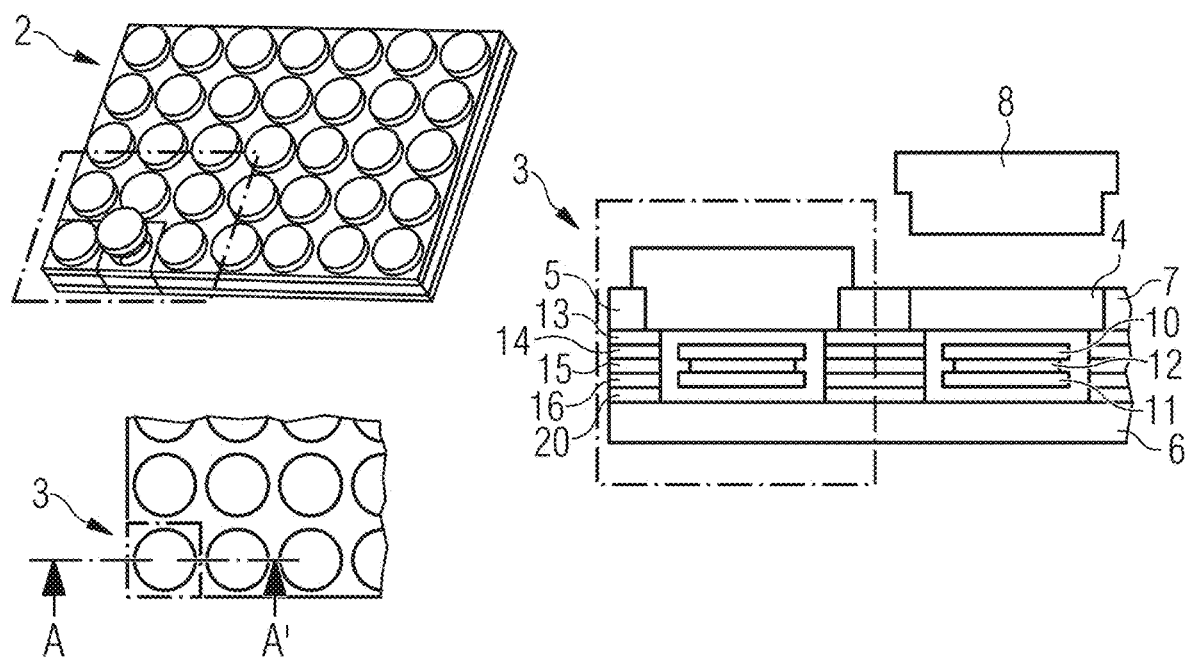
FIG. 4 schematically the device in an oblique view (left top panel), the top view of the enclosed cells (left bottom panel), and the cross-section along the line A-A' of the cells.

Referring to FIGS. 1 to 4, the device 2 comprises a top plate 5 with an opening 7 equipped with a cap 8, a top separator 13, a first thin-plate frame 14 to which a plurality of first thin-plates 10 of the sample holders 9 is connected via spacer bars 21, a thin-plate separator 15, a second thin-plate frame 16 to which a plurality of second thin-plates 11 is connected via the spacer bars 21, a bottom separator 20 and a bottom plate 6 (see FIGS. 1, 3 and 4). For each sample holder 9, the top thin-plate 10 and the bottom thin-plate 11 sandwich the solution 12.

FIG. 2 shows schematically a sample holder 9 comprising the first thin-plate 10 and the second thin-plate 11. The right panel shows schematically the cross-section of said sample holder 9 along the plane that goes through the line A-A' indicated in the left panel. Between said thin-plates 10,11, said solution 12 is stored. Small crystals 28 are grown in the solution 12.

To grow crystals of molecules, the device 2 is assembled for example in the following order. Firstly, said first thin-plate separator 15, said second thin-plate frame 16 with the plurality of said second thin-plates 11 and said bottom separator 20 are stacked on top of said bottom plate 6. Secondly, the solution droplets are dispensed on the plurality of said second thin-plates 11. Thirdly, said top plate 5 with said caps 8, said top separator 13, said first thin-plate frame 14 with the plurality of said first thin-plates 10, and said thin-plate separator 15 are stacked. Lastly, said stack of the layers 5, 13, and 14 is stacked on top of a stack comprising the layers 15, 16, 20, and 6. Each well 4 of the cells 3 of the device 2 is sealed by way of adhesives added between the layers and the top and bottom plates 5, 6. It is favoured that a guide structure for alignment of the said layers and said top and bottom plates is provided for aligning the layers to assemble the device for example to provide holes to the layers and protrusions to the bottom and/or top plates at the position of said holes for the layers.

Figure 5:
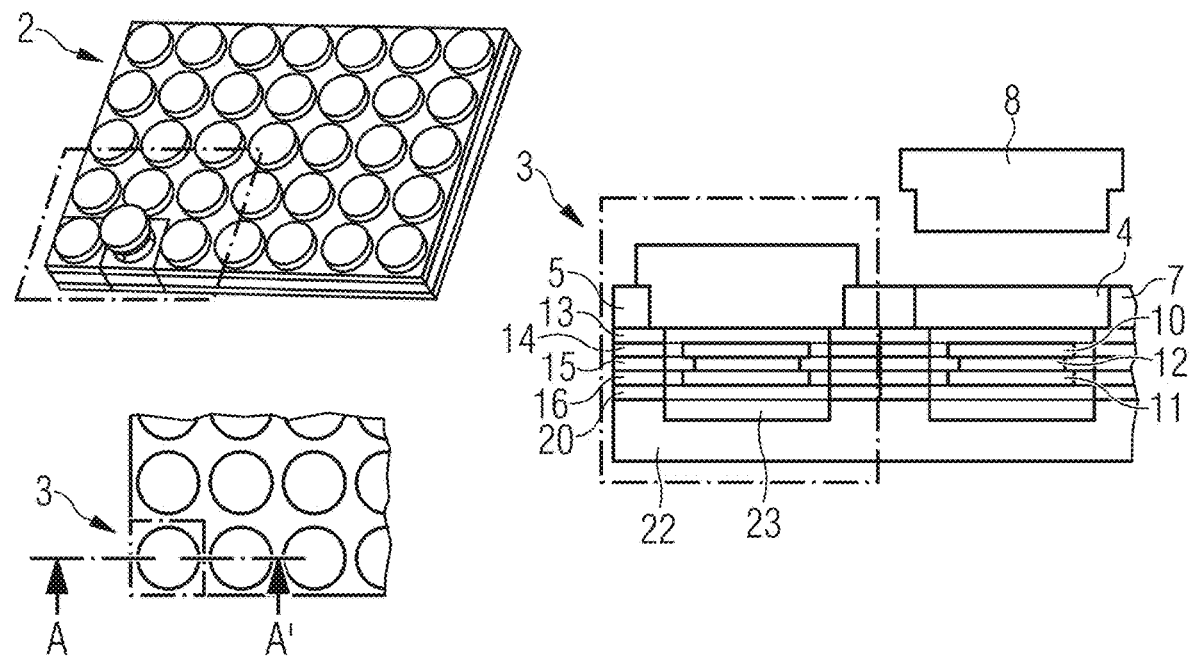
FIG. 5 schematically the device in an oblique view (left top panel), the top view of the enclosed cells (left bottom panel), and the cross-section along the line A-A' of the cells.

FIG. 5 schematically shows the device 2 in an oblique view (left top panel), the top view of the enclosed cells 3 (left bottom panel), and the cross-section of the cells 3 along the plane that goes through the line A-A', when the top plate 5 has the opening 7 that is equipped with the cap 8 that seals said well 4 and can be opened as shown on the right side to extract the sample holder 9 from the well 4 individually without opening other wells 4. A bottom plate 22 has an extra recess volume 23 to store solution 12 in the wells 4 within a volume that can be set independently from the thicknesses of the top separator 13, the first thin-plate frame 14, the thin-plate separator 15, the second thin-plate frame 16 and the bottom separator 20.

Figure 6:
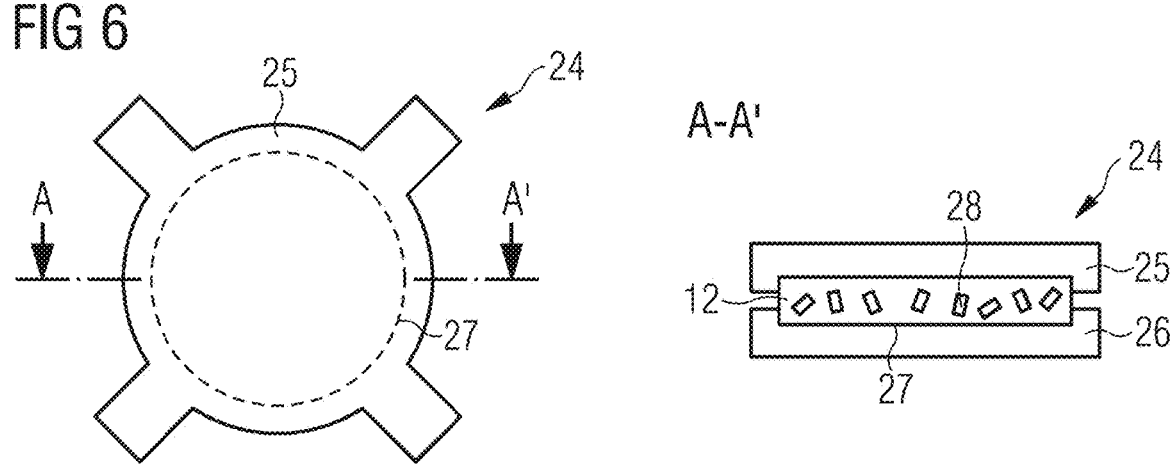
FIG. 6 schematically an example for a sample holder comprising the first thin-plate, the second thin-plate, and a solution therebetween.

FIG. 6 schematically shows a sample holder 24 comprising a first thin-plate 25 and a second thin-plate 26. The right panel shows schematically the cross-section of said sample holder 24 along the plane that goes through the line A-A' indicated in the left panel. Between said thin-plates 25, 26 the solution 12 is stored. Small crystals 28 are grown in the solution 12. The thin-plates 25, 26 have additional recess volumes 27 on the surface facing the solution 12 to be able to adjust the volume of the solution 12 independent from the separation between the thin-plates 25, 26.

FIG. 7 schematically shows a sample holder 30 comprising a first thin-plate 31 and a second thin-plate 32. The right panel shows schematically the cross-section of said sample holder 30 along the plane that goes through the line A-A' indicated in the left panel. Between said thin-plates 31, 32 the solution 12 is stored. Small crystals 28 are grown in the solution 12. The thin-plates 31, 32 have additional recess volumes 33 on the surface facing the solution 12 to be able to adjust the volume of said solution 12 independent from the separation between the said thin-plates 31, 32. Said recess volumes 33 can be extended on the surface of the spacer bars 21.

FIG. 8 schematically shows a sample holder 35 comprising a first thin-plate 36 and a second thin-plate 37. The right panel shows schematically the cross-section of said sample holder 35 along the plane that goes through the line A-A' indicated in the left panel. Between said thin-plates 36, 37 the solution 12 is stored. Small crystals 28 are grown in the solution 12. The thin-plates 36, 37 have additional recess volume 38 on the surface facing the solution 12 to be able to adjust the volume of the solution 12 independent from the separation between the said thin-plates 36, 37. An adhesive 39 at the edge of the two thin-plates 36, 37 seals the volume for the solution 12.

FIG. 9 schematically shows an example of the cell 3 comprising the top plate 5, the bottom plate 6, the top separator 13, the first thin-plate frame 14, the thin-plate separator 15, the second thin-plate frame 16, the bottom separator 20, a first thin-plate 36, a second thin-plate 37 and an adhesive 39. A sample holder comprises said first thin-plate 36 and the second thin-plate 37, wherein the surface of the thin-plates 36, 37 facing each other comprises recess volumes. The edge of the thin-plates 36, 37 are sealed by the adhesive 39. The sample holder is connected to the well via the spacer bars 21 around the first thin-plate 36 that are connected to the first thin-plate frame 14. The spacer bars around the second thin-plate 37 are connected to the second thin-plate frame 16, or the spacer bars 21 around the adhesive 39 are connected to the first thin-plate separator 15 or a combination of those or all of those.

FIG. 10 schematically shows the device 2 in an oblique view (left top panel), the top view of the enclosed cells (left bottom panel), and the cross-section of the cells 3 along the plane that goes through the line A-A' when the top plate 5 has an opening 7 that is equipped with the cap 8 that can seal said well 4 and can be opened as shown on the right side to extract the sample holder from the well 4 individually without opening other wells 4. The sample holder 9 comprises the first thin-plate 36 and the second thin-plate 37 with recess volumes on the surface facing each other are glued by the adhesive 39 at the edges of the thin-plates 36, 37.

Figure 11A:
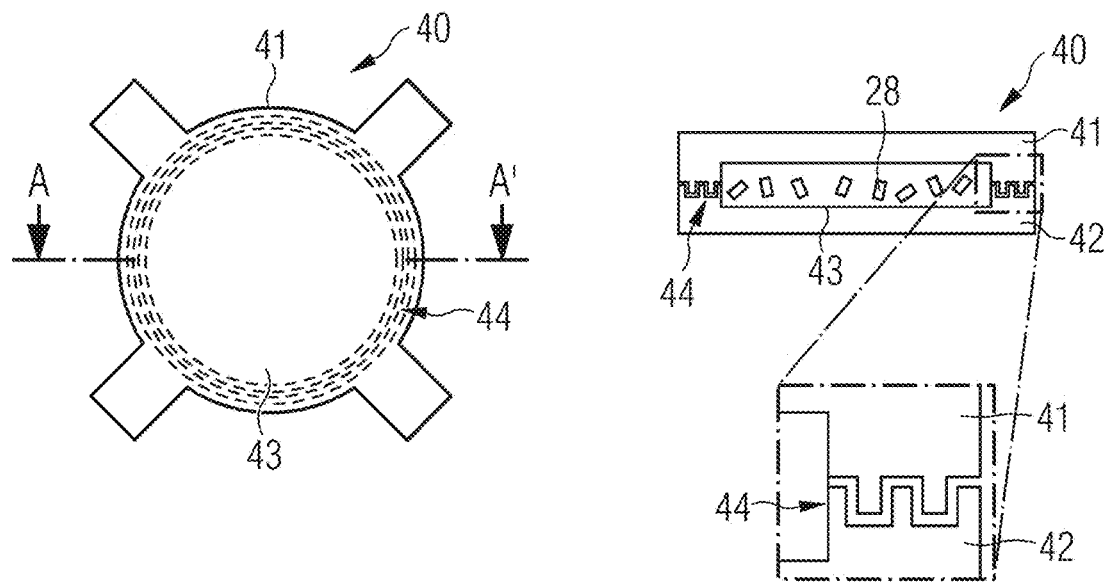
FIG. 11A schematically another example for a sample holder comprising a first thin-plate, a second thin-plate, and a solution therebetween (left panel), and the cross-section along the plane that goes through the line A-A' of the sample holder (right panel)
Figure 11B:
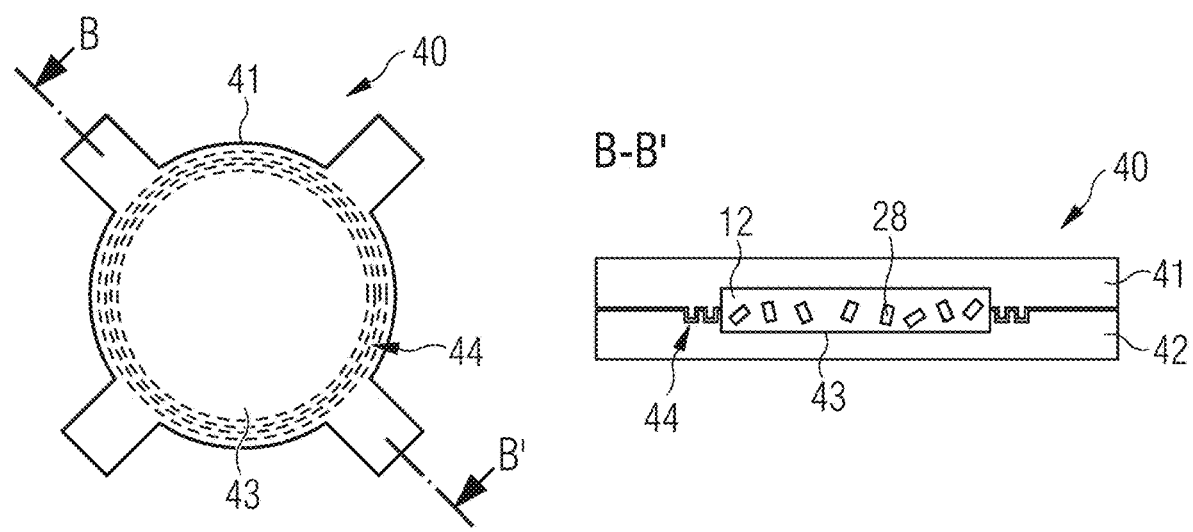
FIG. 11B schematically the sample holder of FIG. 11A; the right panel shows the cross-section along the plane that goes through the line B-B' of the sample holder.

FIGS. 11(*a*) and (*b*) schematically shows a sample holder 40 comprising a first thin-plate 41 and a second thin-plate 42. The right panels of the Figures show schematically the cross-section of said sample holder 40 along the plane that goes through the line A-A' indicated in the left panel of FIG. 11(*a*) and the cross-section of said sample holder 40 along the plane that goes through the line B-B' indicated in the left panel of FIG. 11(*b*). Between said thin-plates 41, 42 the solution 12 is stored. Small crystals 28 are grown in the solution 12. The thin-plates 41, 42 have additional recess volumes 43 on the surface facing the solution 12 to be able to adjust the volume of said solution 12 independent from the separation between the said thin-plates 41, 42. A surface structure 44 comprising protrusions or groves or both at the edge of said two thin-plates 41, 42 narrows the separation between the said thin-plates 41, 42. The narrowed separation between the said thin-plates 41 and 42 may enhance the sealing effect when an adhesive is added to seal the said thin-plates 41, 42 at the edge of the two thin-plates 41, 42.

In general, the material of all thin-plates can be transparent for easier sample holder observation to monitor the growth of the crystals in the meso phase. In order to avoid unnecessary X-ray scattering from the thin-plates for a high signal to noise ratio in the diffraction images, the material of the thin-plates can be amorphous or non-crystalline. The material of the thin-plates should be dense in the sense that the solution 12 does not penetrate into the thin-plates. Further, at least part of the surface of thin-plates of said sample holders can be chemically modified to increase the hydrophilicity. Preferably, the thin plates of the sample holders 9 are designed as a thin plate with low X-ray scattering; said thin plate are preferably made of polyimide or fluorinated polyimide having a thickness in the range from 5 to 50 μm, preferably 20 to 25 μm.

The plurality of the cells 3 of said device 2 may be given by 8 rows and 12 columns with the pitch of 9.1 mm as given by the crystallisation standard such as a 96-well, ANSI standard SBS (The society of biomolecular screening) plate. The geometry of said sample holders 9, 24, 30, 35, and 40 may be 4 mm diameter disc part attached with four spacer bars with 0.5 mm width and 1 mm length. The material of said thin-plate may be polyimide, fluorinated polyimide or other similar polymers with small transmission of water. The thickness of said thin-plate may be in the range of 12 to 25 microns or thinner as long as the integrity of the sandwich sample holder is kept. It is favoured that the sample holder is compatible with the high positional stability and the rotation controllability in an acoustic levitator for X-ray beam scan.

When the sample holder 9 is acoustically levitated in a system 70 or 120, the spacer bars 21 around the circumference of the disc part of the sample holder improve the stability of the sample holder in terms of the positional stability and the stability of the rotation along the axis perpendicular to the disc plane. This is also by preventing the rotation of the levitated sample holder around rotation axes lying in the plane of the disc part of the sample holder.

The number N of said spacer bars may be four and said spacer bars may be arranged symmetrical in terms of the rotation around the axis that goes through the centre of the disc and is perpendicular to the disc plane of the sample holder as shown in FIG. 4. Nevertheless, it goes without saying that the sample holder can have a similar symmetric shape or quasi symmetric shape as well as a shape with N larger or smaller than 4.

Figure 12:
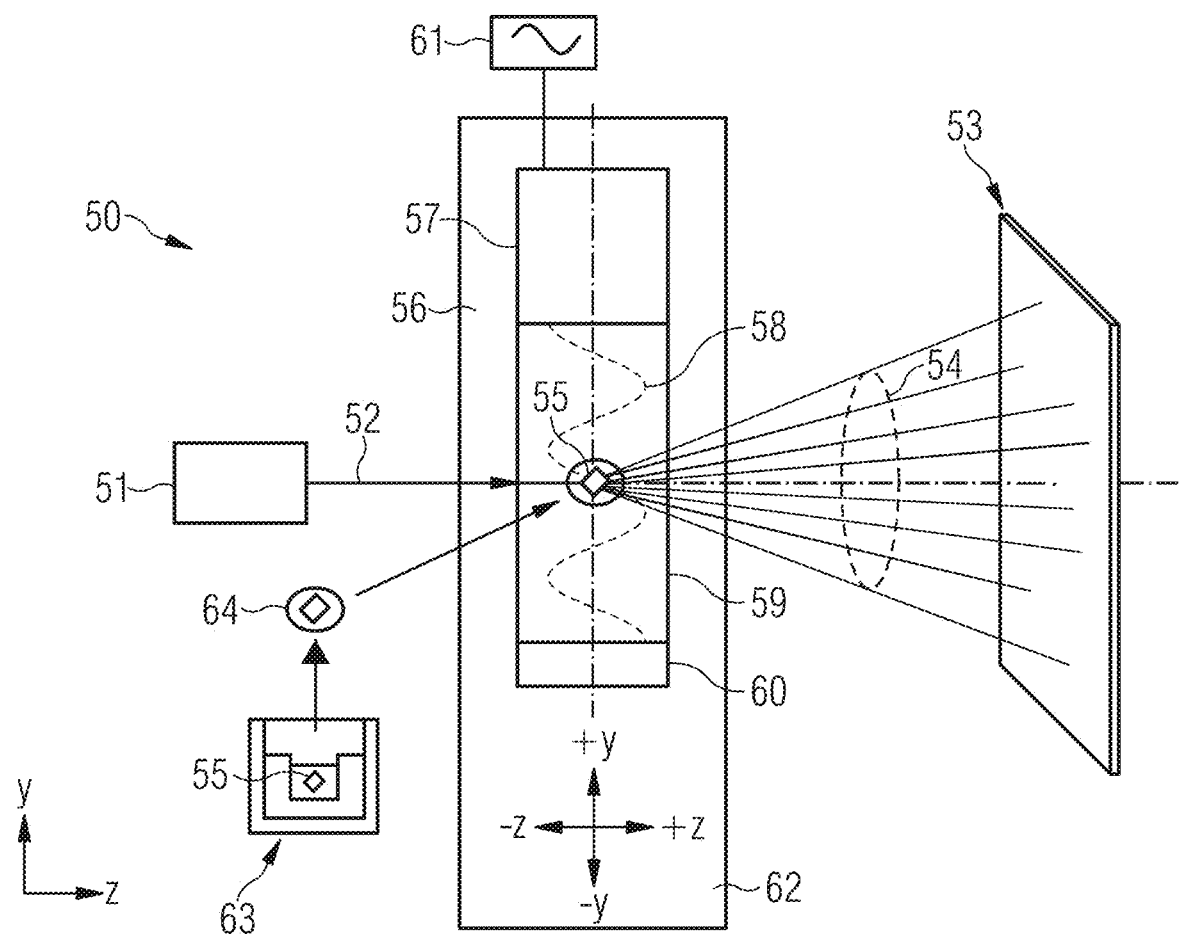
FIG. 12 schematically from the side a prior art instrument to conduct automated crystal diffraction experiments.

FIG. 12 schematically shows from the side a prior art system 50 to conduct automated crystal diffraction experiments. Single crystals 55 of sufficient quality to resolve the crystal structure at atomic resolution are grown and stored in wells in a crystallisation plate 63. Said a single crystal 55 encapsulated in a droplet 64 is harvested and loaded in an ultrasound acoustic levitator 56, which comprises ultrasound transducers 57 driven by electrical supplies 61, acoustic mirror reflectors 60 and an acoustic cavity 59 wherein the acoustic standing wave 58 is excited. An X-ray source 51 produces an X-ray beam 52. Said X-ray beam 52 irradiates said crystals 55. The X-ray diffraction 54 from said crystals 55 is recorded by a fast-frame-rate pixelated X-ray image detector 53. The crystal 55 is rotated with the rotation speed adjusted by the ultrasound acoustic standing wave 58 by adjusting the output of said electrical power supply 61 or by adjusting the resonance of the said acoustic cavity 59. The position of the said crystal 55 is aligned to the said X-ray beam 52 by an apparatus 62 wherein the acoustic levitator 56 is mounted.

Figure 13:
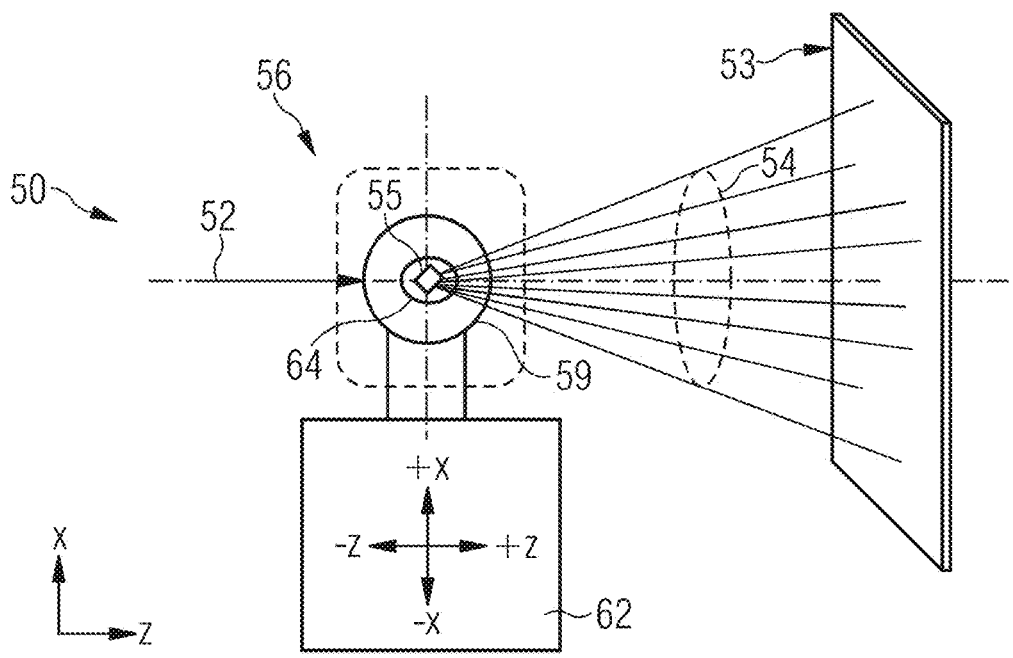
FIG. 13 schematically from the top a prior art instrument to conduct automated crystal diffraction experiments depicted in FIG. 12.

FIG. 13 schematically shows from the top a prior art system 50 to conduct automated crystal diffraction experiments as depicted in FIG. 12.

Referring to FIGS. 12 and 13, the system 50 to conduct automated X-ray diffraction experiments for a single crystal of molecules 55 requires that the harvesting and loading of the crystal into the acoustic levitator may be accomplished remotely by the acoustic ejection of the crystal together with the crystallisation liquid by a focused acoustic radiation or by the acoustic ejection from a capillary filled with the crystals with the crystallisation liquid and subsequent capturing of the ejected droplet by the acoustic levitator. The crystal in the levitated droplet is rotated at a desired rotation speed by adjusting the strength of the convective flow in the levitated droplet containing the crystal 55, whereby the strength and the spatial pattern of the convective flow is determined by the ultrasonic acoustic wave via the strength and the spatial pattern of the acoustic streaming around the droplet. However, the remote harvesting and loading of crystals prepared in a highly viscous medium such as the meso phase is difficult with the instrument 50 because of the difficulties in terms of the loading of the highly viscous droplet into the acoustic levitator and the automatic harvesting and loading of crystals in particular for those in the meso phase medium used for the state-of-the-art crystallisation method of membrane proteins by acoustic ejection.

Figure 14:
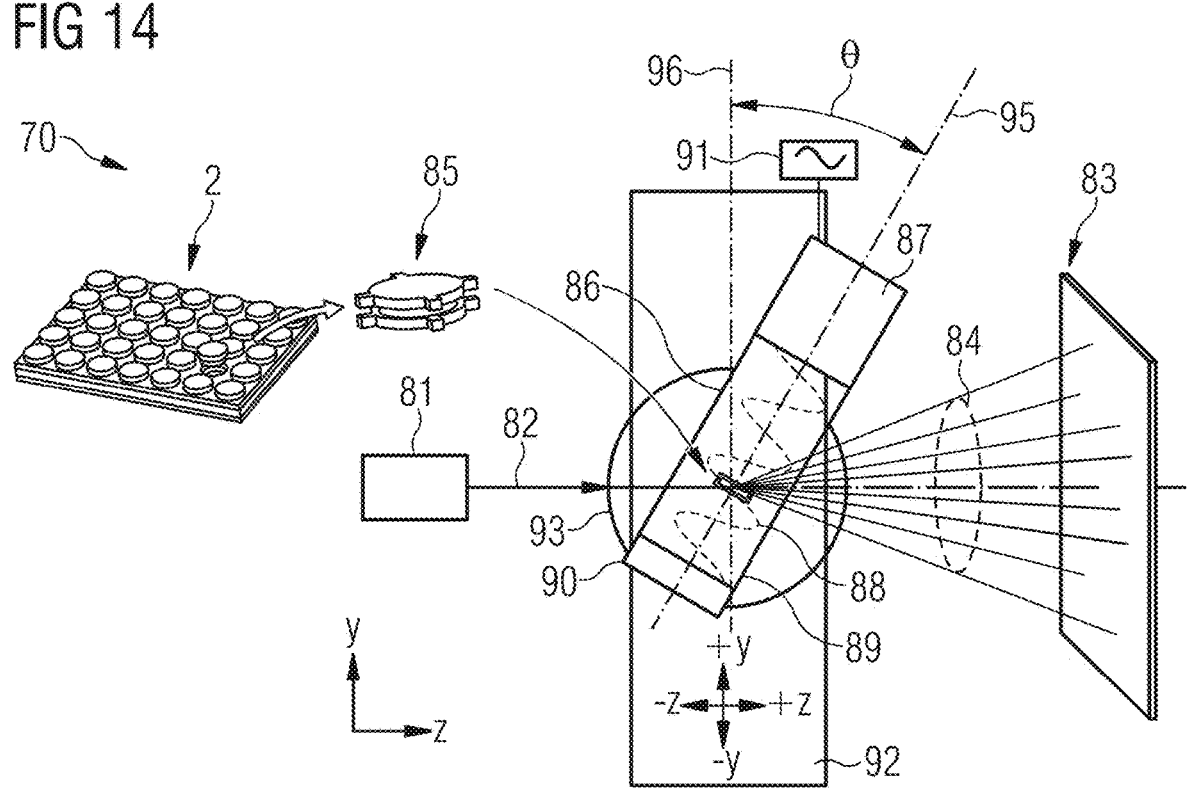
FIG. 14 schematically from the side a system to conduct X-ray diffraction experiments of small crystals grown in a sample holder.

FIG. 14 schematically shows in a side view a system 70 according to the present invention to conduct X-ray diffraction experiments of small crystals 28 grown in a sample holder 85. Using automated apparatus 101, 102, 103, said sample holder 85 is remotely harvested from one of the wells 4 of the device 2 and loaded into the ultrasonic acoustic levitator 86, which comprises ultrasound transducers 87 driven by electrical supplies 91, acoustic mirror reflectors 90, the acoustic cavity 89 in which the acoustic standing wave 88 is excited. An X-ray source 81 produces an X-ray beam 82. Said sample holder 85 is rotated with the rotation axis perpendicular to the disc plane of the sample holder 85 with the rotation speed adjusted by the ultrasound acoustic pressure of the acoustic standing wave 88 by adjusting the output of said electrical power supply 91 or by adjusting the resonance of the said acoustic cavity 89. The position of said sample holder 85 is aligned to the said X-ray beam 82 by an apparatus 92, on which the acoustic levitator 86 is mounted. The axis 95 of the acoustic levitator can be rotated by an angle θ from the vertical direction 96 by an apparatus 93 so as to be able to irradiate the X-ray beam to the sample holder at an oblique angle.

Figure 15A:
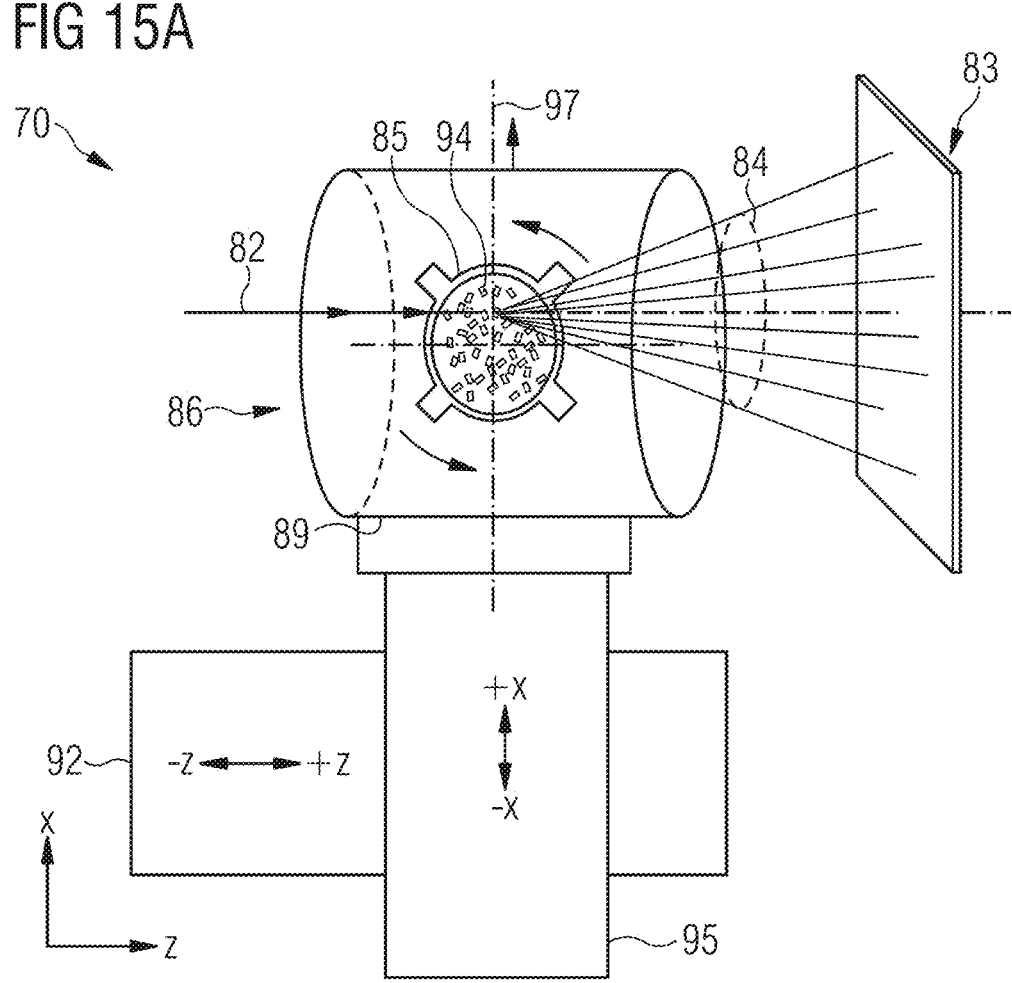
FIG. 15A shows schematically from the top an system of X-ray diffraction experiment of small crystals grown in the sample holder levitated and rotated in an acoustic levitator.

FIG. 15(a) shows schematically from the top the system 70 of X-ray diffraction experiment of small crystals 94 grown in the sample holder 85 levitated and rotated in the acoustic levitator 86. Said X-ray beam 82 irradiates said small crystals in said sample holder 85. The X-ray beam is scanned on the sample holder 85 along a spiral trajectory 110. During the data collection, the X-ray diffraction 84 from said crystals 94 is continuously recorded by a fast-frame-rate pixelated X-ray image detector 83, while said sample holder 85 is rotated and moved in the x-direction by apparatus 95.

Figure 15B:
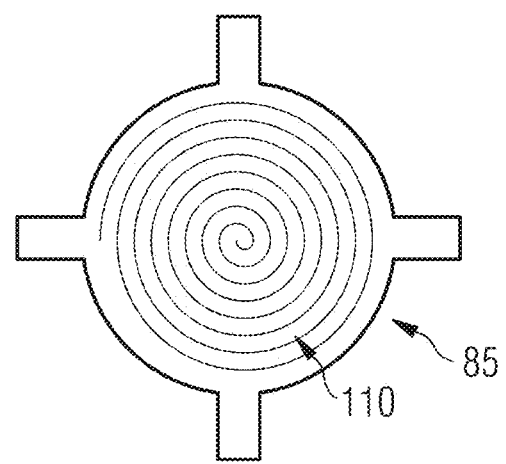
FIG. 15B shows a schematic spiral trajectory of an X-ray beam on a sample holder.

FIG. 15(b) schematically shows the spiral trajectory 110 of the X-ray beam 82 on the sample holder 85, when the levitated sample holder 85 was rotated at 1 turn/s and translated in the horizontal direction at the velocity of 0.25 mm/s for 8 seconds. The diameter of the circular part covered by the X-ray beam 82 on the sample holder 85 is 4 mm.

Figure 16:
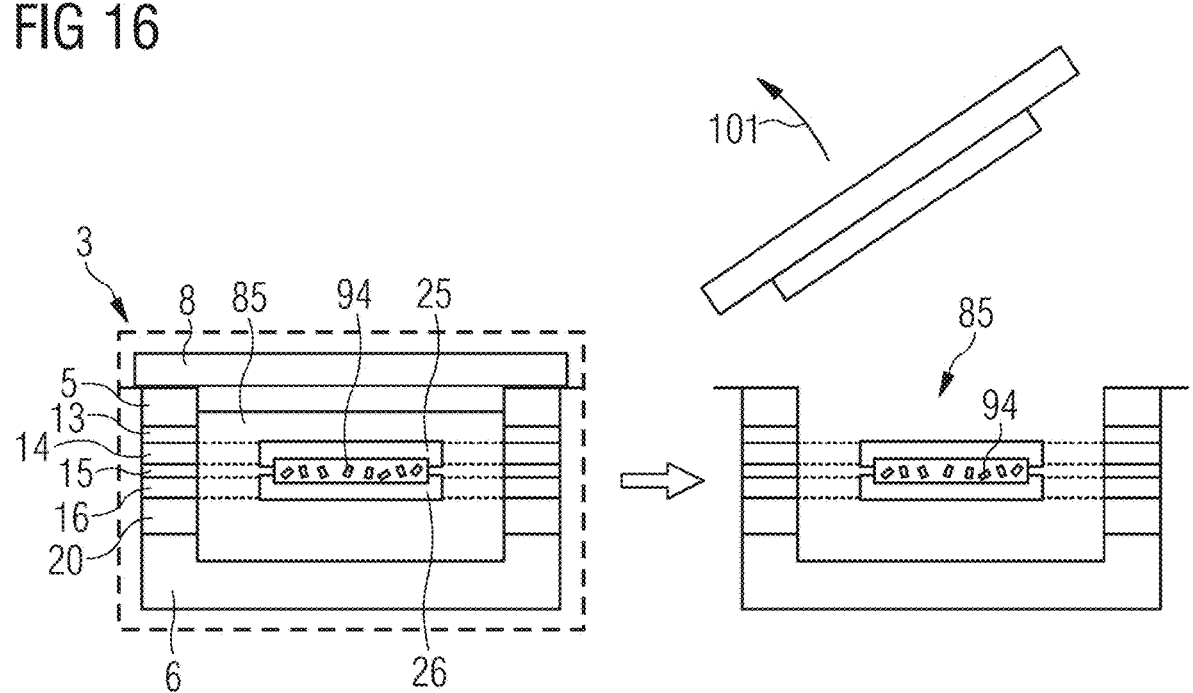
FIG. 16 schematically an apparatus opening one of the wells of a device without opening other wells, said device comprising a plurality of cells.

FIG. 16 schematically shows an apparatus 101 opening one of the wells 4 of a device 2 without opening other wells.

Figure 17:
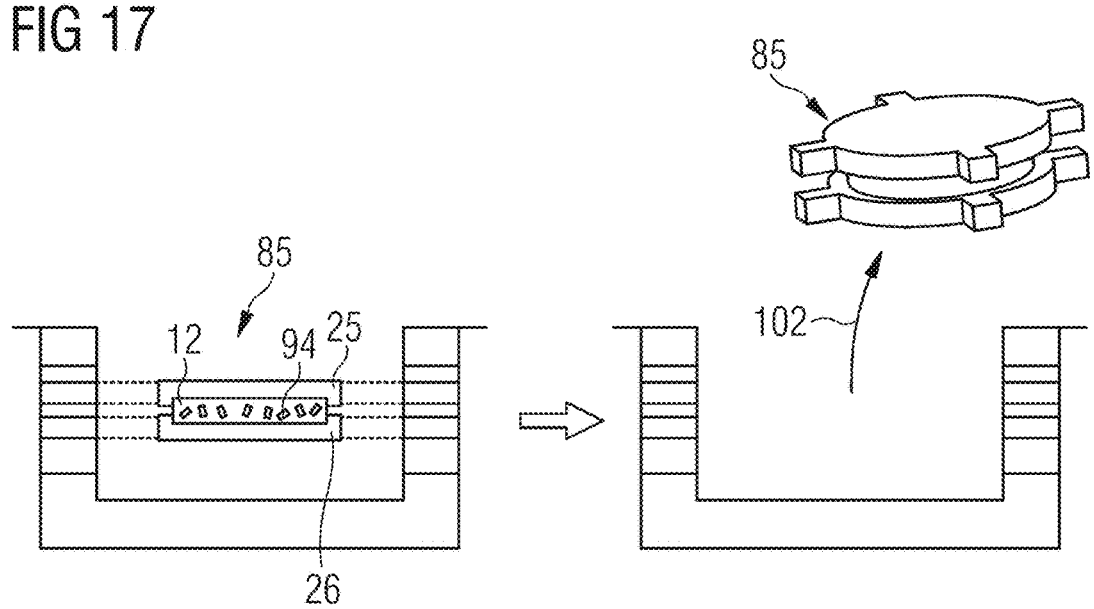
FIG. 17 schematically an apparatus extracting one of the sample holders from one of the wells when one of the wells is opened.

FIG. 17 schematically shows an apparatus 102 extracting one of the sample holders 85 from the opened well 4 of the device 2.

Figure 18:
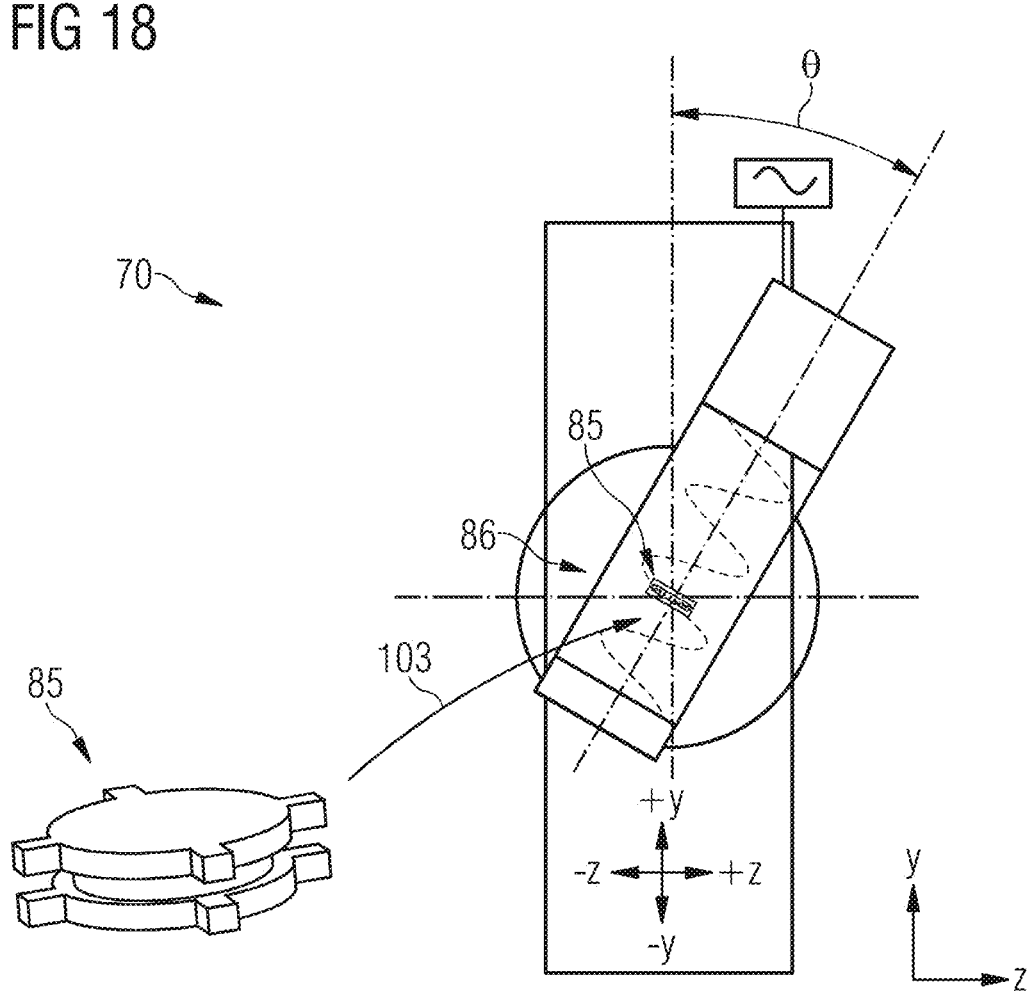
FIG. 18 schematically an apparatus delivering one of the sample holders extracted from one of the wells of the device to the acoustic levitator of the instrument.

FIG. 18 schematically shows an apparatus 103 delivering one of the sample holders 85 extracted from one of the wells 4 to the acoustic levitator 86 of the instrument 70 to conduct X-ray diffraction experiments of small crystals.

Figure 19:
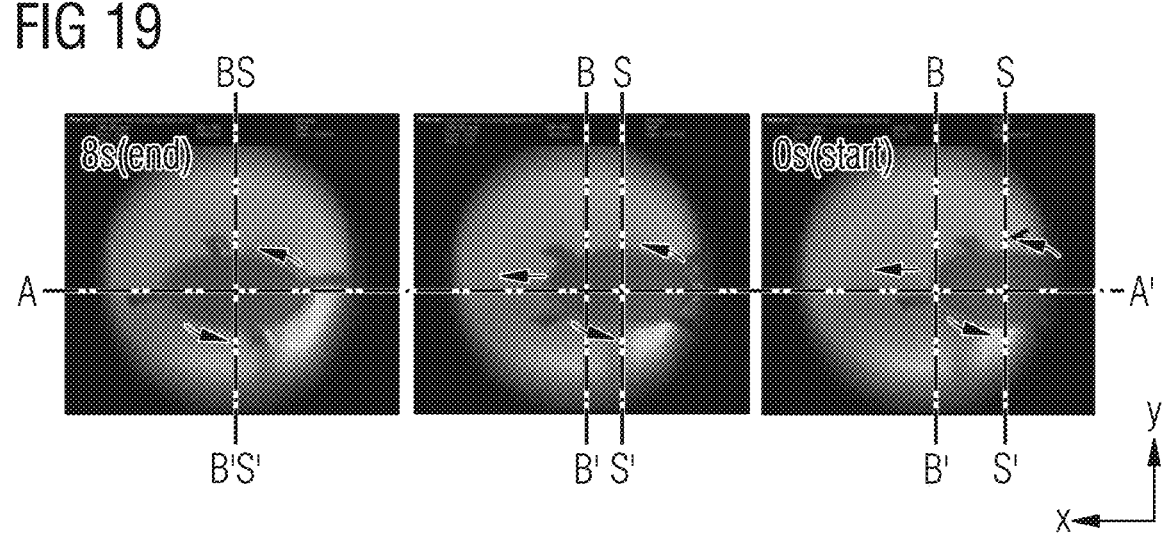
FIG. 19 schematically snapshots of a levitated sample holder at 0 s (start of the scan), 4 s, and 8 s (end of the scan) during an X-ray diffraction experiment.

FIG. 19 shows snapshots of a levitated sample holder 85 at 0 s (start of the scan), 4 s, and 8 s (end of the scan) during an X-ray diffraction experiment taken from the direction of the X-ray beam. The levitated sample holder 85 was rotated at about 1 turn/s and translated in the horizontal direction from right to left in the +x-direction at the velocity of 0.25 mm/s. The duration of the data collection was 8 s, during which the diffraction images were captured continuously. In each picture, the X-ray beam spot was at the intersection of the line A-A' and the line B-B' of each picture. The centre of the sample holder is at the intersection of the line A-A' and the line S-S' of each picture.

Figure 20:
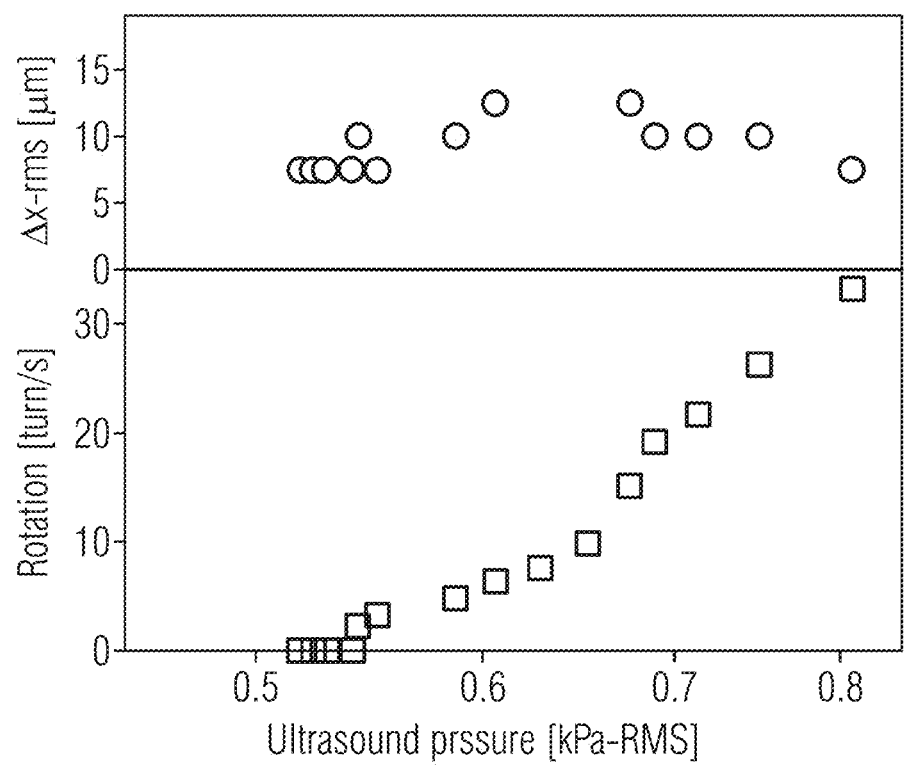
FIG. 20 a bottom panel showing the relationship between the rotation speed of a levitated sample holder and the amplitude of the ultrasonic pressure when the axis of the acoustic levitator is rotated by 30° from the vertical direction and a top panel showing the relationship between the root-mean-square (RMS) variation of the centre of the rotation of a levitated sample holder and the amplitude of the ultrasonic pressure when the axis of the acoustic levitator is tilted by 30° from the vertical direction.

FIG. 20 shows in the bottom panel the relationship between the rotation speed of a levitated sample holder 85 and the amplitude of the ultrasonic pressure when the axis of the acoustic levitator is rotated by 30° from the vertical direction. The top panel shows the relationship between the root-mean-square (RMS) variation of the centre of the rotation of a levitated sample holder and the amplitude of the ultrasonic pressure when the axis of the acoustic levitator is tilted by 30° from the vertical direction.

Figure 21:
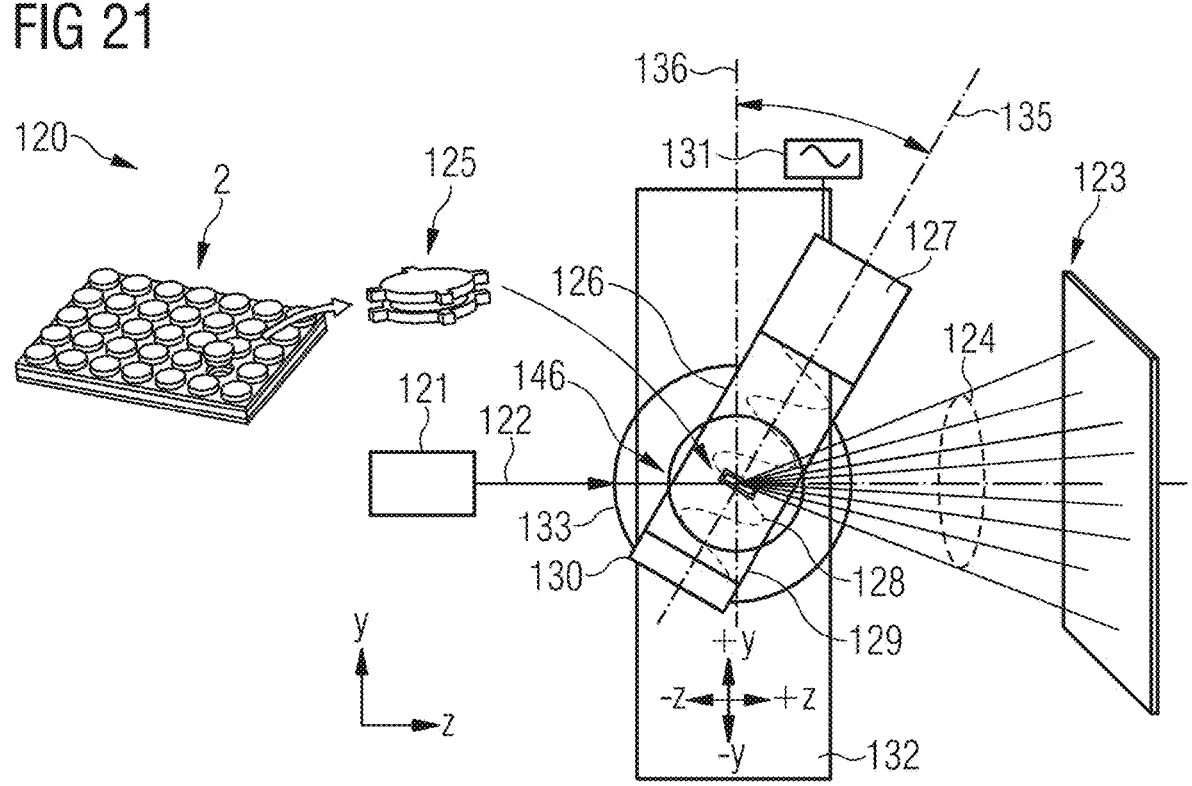
FIG. 21 schematically from the side an instrument to conduct X-ray diffraction experiments of small crystals grown in a sample holder.

FIG. 21 schematically shows in a side view a further system 120 to conduct X-ray diffraction experiments of small crystals 134 (see FIG. 22) grown in a sample holder 125. Using automated apparatus 101, 102, 103, said sample holder 125 is remotely harvested from one of the wells 4 of the device 2 and loaded into an ultrasonic acoustic levitator 126 which comprises ultrasound transducers 127 driven by electrical supplies 131, acoustic mirror reflectors 130, an acoustic cavity 129 in which the acoustic standing wave 128 is excited. The X-ray source 121 produces an X-ray beam 122. Said sample holder 125 is rotated with the rotation axis perpendicular to the disc plane of the sample holder with the rotation speed adjusted by the acoustic field excited by an apparatus 146. The position of said sample holder 125 is aligned to the said X-ray beam 122 by an apparatus 132 on which the acoustic levitator 126, the apparatus 133 and 146 are mounted. The axis 135 of the acoustic levitator 126 can be rotated by an angle θ from the vertical direction 136 by the apparatus 133 so as to be able to irradiate the X-ray beam to the sample holder at an oblique angle.

FIG. 22 shows schematically from the top the system 120 to conduct X-ray diffraction experiment of small crystals 134 grown in the sample holder 125 levitated and rotated in the acoustic levitator 126. Said X-ray beam 122 irradiates said small crystals grown in said sample holder 125. The X-ray beam is scanned on the sample holder along a spiral trajectory 110. During the data collection, the X-ray diffraction 124 from said crystals is continuously recorded by a fast-frame-rate pixelated X-ray image detector 123 while said sample holder is rotated and moved in the x-direction by the apparatus 135. Said sample holder 125 is rotated with the rotation axis perpendicular to the disc plane of the sample holder 125 with the rotation speed adjusted by the acoustic field 151 in the direction perpendicular to the X-ray beam excited by the apparatus 146 which comprises ultrasonic transducers 147 driven by electrical power supplies 149, acoustic reflectors 148 and an acoustic cavity 150. The rotation of said levitated sample holder 125 is regulated by the ultrasonic pressure of the standing wave 151.

Figure 23A:
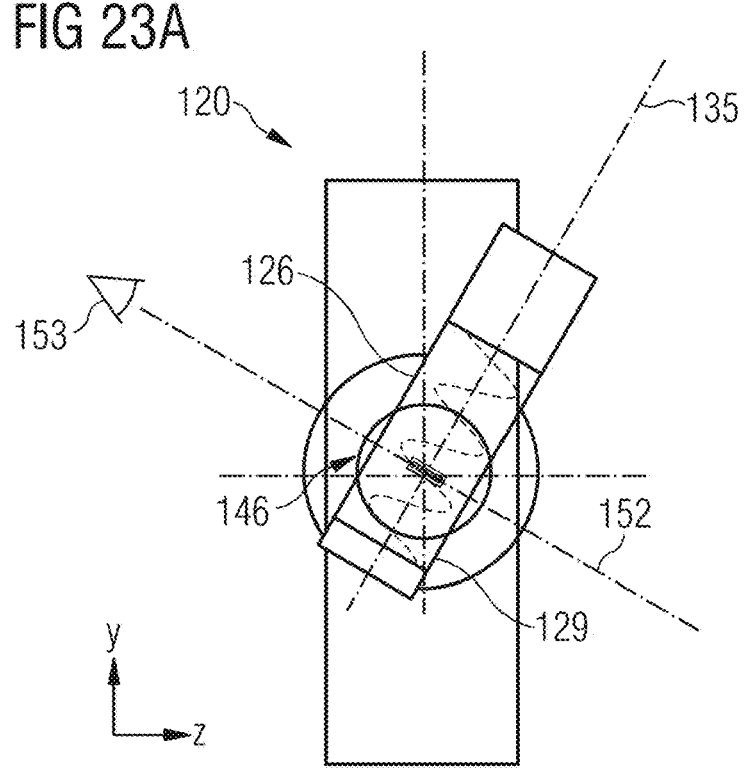
FIG. 23A schematically from the side an instrument for X-ray diffraction experiments with small crystals grown in the sample holder levitated and rotated in an acoustic levitator.
Figure 23B:
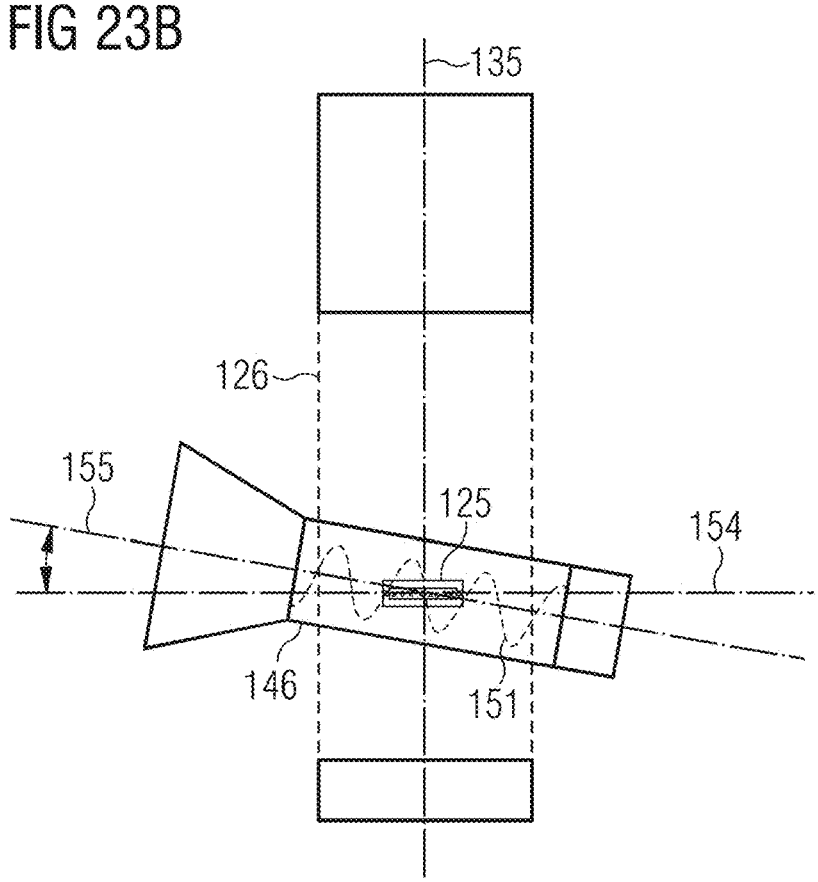
FIG. 23B schematically from the side as seen from a point along the direction of an instrument for X-ray diffraction experiment with small crystals grown in the sample holder when the transverse acoustic standing wave regulates the rotation of the sample holder.

FIG. 23(a) schematically shows from the side the system 120 of X-ray diffraction experiment of small crystals 134 grown in the sample holder 125 levitated and rotated in an acoustic levitator. FIG. 23(b) shows schematically from the side viewed from the view point 153 along the direction 152 of the system 120 of X-ray diffraction experiment of small crystals 134 grown in the sample holder 125 when the transverse acoustic standing wave 151 regulates the rotation of the sample holder. The axis 155 of the acoustic standing wave 151 excited in the apparatus 146 is rotated by φ from the axis 154 which is perpendicular to both the axis 135 and the direction 152.

In FIG. 24, a bottom panel shows the relationship between the estimated dose on small crystals grown in a sample holder as function of the frame number. The top panel shows the accumulated number of small crystals hit by X-ray as the scan proceeds. The assumed parameters are: Photon flux of $10^{12}$ photon/s, the X-ray beam spot size of 5 μm, the crystal size of 20 μm, the frame rate of the X-ray image detector of 3 kHz, the transverse translation speed of the sample holder at 0.25 mm/s, and the total scan time of 8 s. There different sample holder rotation speeds, 0.5 (a), 1 (b), and 2 (c) turn/s were assumed.

Referring now again to FIGS. 14 to 18, the instrument 70 of the automated X-ray diffraction experiments for small crystals 28, 94 contained in the sample holder 10, 85 extracted from the wells of the device 2 has the capability to determine the crystal structure at atomic resolution in the order of 2 Angstrom or better. The sample holder is automatically harvested and delivered into the ultrasonic acoustic levitator 86 by using the respective apparatus 101, 102, 103 for remote harvesting and loading of said sample holder. In contrast to the prior-art instrument 56, by the use of the device 2 to grow small crystals in the meso phase medium in the sample holder, the present invention provides an instrument to collect in a highly automated manner the X-ray diffraction dataset to determine their crystal structures at atomic resolution for crystals in highly viscous medium with minimal manual intervention.

The X-ray diffraction dataset comprises the multiple X-ray diffraction images from multiple crystals with random crystal orientations contained in each sample holder 85 and the crystal structure at atomic resolution is determined by using a state-of-the-art algorithm to analyse such serial crystallography data. Each crystal of random crystal orientation is nominally irradiated only once by highly brilliant X-ray beam.

Referring now to FIG. 15(a), a schematic top view of the instrument 70 the levitated sample holder is rotated along an axis that is perpendicular to the disc plane of the sample holder either in clockwise or counter clockwise, and moved in the direction perpendicular to the X-ray beam and the axis of the acoustic levitator along the +x or −x direction during the data collection. This way, the X-ray beam is scanned on the sample holder along a spiral trajectory 110 which is for example shown in FIG. 15(b).

The harvesting and loading of individual sample holder for the X-ray diffraction experiments comprises following steps that are accomplished remotely:

a) The apparatus 101 opens the cap 8 on top of one of the wells 4 of said device 2.
b) The apparatus 102 extracts the sample holders from said opened well 4.
c) The apparatus 103 delivers said sample holder to the acoustic levitator 86;
d) and the position and the rotation of the levitated sample holder is then adjusted accordingly.

The individual opening 7 of the top plate 5 can be sealed by the cap 8 to enable the repeated opening and sealing of the well 4 by a remote controllable manipulator by handling the cap 8 for example as a screw which is the operation of the apparatus 101. When the wells 4 of said device 2 are equipped with a second cap underneath the well 4, the said apparatus 101 may also open the second cap.

The said sample holder in said well 4 of said cell 3 is attached to the first thin-plate frame 14 and the thin-plate frame 16. The extraction of said sample holder by the apparatus 102 from said well 4 includes the detachment of said sample holder from 14 and 16 and the pickup of said sample holder to the outside of said well 4. The detachment can be accomplished by cutting the end of the spacer bars 21 of the sample holders. A suitable mechanical manipulator that may include a vacuum chuck or a Bernoulli gripper can accomplish the pickup.

The automated loading apparatus 103 of said sample holder to the acoustic levitator 86 may accomplish the task by way of placing the sample holder on a thin folk or a holder of a low-density material with minimal physical contact with the sample holder and inserting the sample holder into the acoustic levitator whereby the acoustic radiation force can pick up the sample holder from such sample holder holders. Alternatively, the sample holder-pickup manipulator that utilise for example a vacuum chuck from a small plastic capillary can deliver the sample holder into the acoustic levitator. The release of the sample holder from the manipulator can be accomplished by closing the vacuum line or by applying a weak positive pressure at the tip of the capillary.

Referring to FIG. 20, the typical relationship between the rotation speed of a levitated sample holder and the ultrasonic pressure of a single-axis acoustic levitator as well as the relationship between the root-mean-square positional fluctuation of the levitated sample holder and the ultrasonic pressure of a single-axis acoustic levitator are displayed:

The positional stability of the levitated and rotated sample holder can be within tens of microns as indicated in FIGS. 19 and 20, that are appropriate to realise the stable scanning of the X-ray beam over a spiral trajectory 110 as indicated in FIG. 15(b). The rotation speed and the positional stability of the levitated sample holder in FIG. 20 was evaluated from analysing the video recordings of the rotating sample holders. However, given the high positional stability demonstrated in FIG. 20, the rotation speed can be separately monitored by irradiating the whole or the edge of the rotating sample holder by a narrow optical beam and measuring the modulation frequency of transmission or reflection of the light. Further, thus obtained rotation speed can be used to adjust the ultrasonic pressure of the acoustic levitator to achieve a desired rotation speed in a standard feedback control method.

For sample holders with uniform size and solution therein, repeated adjustments of the levitating position and the rotation of said sample holder in said acoustic levitator are nominally not required after exchanging the sample holder. Nevertheless, the position of the levitated sample holder with respect to the X-ray beam can be remotely adjusted for example by translating the acoustic levitator with respect to the X-ray beam by installing an online image monitor and analysing the recorded images. The rotation speed of the levitated sample holder can be adjusted to a desired value, typically in the range of 0.5-2 Hz, by adjusting the ultrasonic pressure of the acoustic levitator as indicated in FIG. 20.

Referring to FIGS. 21 and 22, the schematics show the instrument 120 to conduct X-ray diffraction experiments of small crystals 134 grown in the sample holder 125 being levitated and rotated in the acoustic levitator 126, wherein an apparatus 146 produces an acoustic field in the direction transverse to the axis 135 of the acoustic levitator 126 and the X-ray beam 122. When the sample holder 125 is levitated at zero rotation, the application of the acoustic radiation force created by the standing wave 151 excited in the apparatus 146 turns on the rotation of the levitated sample holder 125. Referring to FIG. 23 in the schematic side view from the direction 153 along the axis 152, which is perpendicular to both the axis 135 of the acoustic levitator 126 and the direction 137, the axis 155 of said standing wave 151 is rotated from the direction 137 and 154 by 0. When the ultrasound pressure of the acoustic levitator 126 is set to levitate the sample holder at zero rotation, the acoustic radiation force produced by the acoustic standing wave 151 is superposed and initiates the rotation of said sample holder 125, when the total acoustic radiation force exerted on said sample holder is sufficient to rotate it and when the ultrasound pressure of said standing wave 151 is sufficiently weak so as not to flip said sample holder vertically. To avoid the influence of the beating of the standing wave 151 and the standing wave 128 on the rotation and the positional motion of the levitated sample holder, the ultrasound frequencies of said standing waves 128 and 151 may be different more than the amount in the range of 50-100 Hz, that is sufficiently large compared to the inverse of the typical response time of said sample holder in terms of the rotation and the positional motion. The difference frequency of the waves 128 and 151 should not coincide with the frequency range of the axial and radial resonance oscillation (in the range of 10-40 Hz for the ultrasound pressure of 1-3 kPa-rms in the case of spherical liquid droplets) of said levitated sample holder. The amplitude of the ultrasound pressure of 151 may be set to a constant value to start the rotation of said sample holder. Alternatively, the ultrasound pressure of 151 may be amplitude-, frequency-, or pulse-modulated to regulate the rotation of said sample holder. The X-ray beam 122 is scanned on the sample holder 125 along a spiral trajectory 110. During the data collection, the X-ray diffraction signal 124 from said crystals is continuously recorded by a fast-framerate pixelated X-ray image detector 123, while said sample holder is rotated and moved in the x-direction by the apparatus 135.

Prior art methods to rotate an acoustically levitated object include the use of a mechanical insert to break the cylindrical symmetry of the acoustic standing wave and its mechanical rotation, or the use of the viscous torque produced by the acoustic field with the angular moment in the direction of the axis of the acoustic levitator that can be produced for example by applying a pair of crossed standing waves in the direction perpendicular to the axis of the acoustic levitator whereby the nodes of the two standing waves coincides with the position of the levitated object and the phase of the two standing waves are shifted for example by 90 degrees. However, the required acoustic pressure to induce the sufficient viscous torque, typically with the sound pressure level (SPL) in the order of 150 dB, may not be appropriate to control the rotation of the levitated sample holder considered here, since such a substantial acoustic pressure has a risk to flip the disc plane of the levitated sample holder in the vertical direction.

Comparing to prior art methods to rotate an acoustic levitated object, the present invention provides a simpler configuration that allows for a large stereo angle from the levitated sample holder to the X-ray image detector so that the high angle (in the order of 60° toward the X-ray image detector) and the high-resolution (in the order of 2 Angstrom and better) X-ray diffraction signal is not obstructed. The rotation of the sample holder levitated in the acoustic levitator 86 can be controlled by adjusting the ultrasound pressure of the acoustic standing wave 88 via the coupling of the acoustic radiation force to the sample holder plane with the small elastic or plastic deformation of the sample holder to induce the torque in the direction perpendicular to the disc plane of said levitated sample holder.

The control of the speed and the direction of the rotation of the levitated sample holder in the instrument 120 can be also achieved by applying a narrow air flow ejected from a small capillary on one side of the sample holder or into one of the nodes that is different from the one where said sample holder is levitated. The quantity of the air flow has to be sufficiently weak so as to minimise the additional positional instability. It is noted that the use of an acoustic radiation force exerted by an ultrasound acoustic standing wave to control the rotation speed of the levitated sample holder in the range of 0 to 10 turn/s avoids the addition of such positional instability.

It is also noted that, the rotation speed of the levitated sample holder in the acoustic levitator 86 can be controlled by adjusting the ultrasonic pressure of said standing wave 88, but in some circumstances when the range of the adjustment of the ultrasound pressure becomes substantial, there is a possibility that the said adjustment of the ultrasonic pressure may lead to the variation of the levitated position, in particular in the vertical direction. This interference between the rotation speed control and the levitation position is absent in the instrument 120, when the rotation of said sample holder is regulated by the apparatus 146.

The acoustic levitators 86, 126 can be a single-axis type whereby the cylindrical horn with the diameter of 20 mm is driven by a Langevin-type ultrasonic transducer operating at around 40 kHz, and the horn placed and a concave spherical mirror reflector with the diameter of 20 mm and the focal length of 20 mm placed forms an acoustic cavity. The horn can be at the upper part and the mirror can be at the bottom part of the acoustic levitator to avoid the possible positional disturbances on the levitated sample holder by the convectional air flow from the heated air around the ultrasonic transducer. For the X-ray diffraction experiment, the sample holder can be levitated at around the 3rd pressure node from the mirror reflector when the acoustic levitator is adjusted to the 7th resonance and the acoustic levitator axis is rotated by 30 degrees from the vertical direction or from the direction perpendicular to the X-ray beam.

The rotation speed of the sample holder levitated by the levitators 86, 126 can be controlled in the range of 0.5-2 Hz with the high positional stability in the order of tens of microns by adjusting the ultrasound acoustic pressure between 0.51-0.55 kPa-rms. Apparently, the precise required ultrasonic acoustic pressure varies depending on the exact material, the meso phase medium volume therein, and shape and geometry of the sample holder. The acoustic levitators 86,126 and the precise levitator geometry are not limited to the stated ones as long as the fast data collection of X-ray diffraction images can be achieved with the rapid scan of the X-ray beam over the small crystals in the said sample holders under the condition that the X-ray diffraction is not obstructed up to high angle corresponding to the high resolution in the order of 2 Angstrom or higher.

The apparatus 146 may be an acoustic cavity 150 comprising a catenoidal horn with the tip diameter of 8 mm excited by an ultrasonic transducer driven by a Langevin-type ultrasonic oscillator operating at around 40 kHz and a mirror reflector, wherein the acoustic pressure in the range of 0-0.6 kPa is applied. The frequency and the diameter of the acoustic cavity are not limited to these values so as to match the cavity size and the acoustic wavelength to the size of the sample holder to achieve the rotation in the range of 0-10 Hz.

Apparently, the precise required ultrasonic acoustic pressure varies depending on the exact material, the meso phase medium volume therein, and shape and geometry of the sample holder. The acoustic levitator 86,126 and the apparatus 146 are not limited to the stated ones in frequency or size or driving method as long as the acoustic radiation force exerted on the sample holder 85,125 leads to the desired rotation.

Referring to FIG. 24, in the case of the X-ray beam with the photon flux of $10^{12}$ photon/s, the spot size of 5 micron, for measuring crystals of the size of 20 microns grown in the sample holder, the sufficient dose per crystal ($10^1$-$10^2$ kGy) to record the Bragg reflections at sufficient resolution better than 2 Angstrom can be achieved when the sample holder of 4 mm-diameter (disc part) is rotated at a constant sample holder rotation speed in the range of 0.5-2 turn/s, at a constant velocity of the sample holder in the transverse direction equal to 0.25 mm/s, at the detector frame rate of 3 kHz, and the recording time of the X-ray diffraction images equal to 8 s. The total number of the crystals measured during the 8 s scan is estimated to be 500-2000 when the crystal density in the sample holder is $4 \times 10^4$/cm$^2$.

In the case of the X-ray diffraction data collection utilising the instruments 70, 120, when the rotation speed of the levitated sample holder is increased during the scan at an appropriate rate, one can suppress the increase of the dose per crystal within the dataset for individual sample holder. One may simultaneously decrease the translation velocity of the levitated sample holder in the transverse direction in time at an appropriate rate at the same time to partly avoid the decrease of the total number of the small crystals of the sample holder irradiated by the X-ray beam within the dataset. The variation of the translation velocity of the sample holder during the data collection can be easily achieved by programming the velocity setting of the apparatus 95, 135. The variation of the rotation speed of the sample holder during the data collection can be easily achieved by programming the ultrasound pressure of the acoustic levitator 86 of the instrument 70 accordingly. The variation of the rotation speed of the sample holder during the data collection can be easily achieved by programming the ultrasound pressure of the acoustic levitator 126 of the instrument 120 accordingly or by programming the ultrasound pressure of the apparatus 146 of the instrument 120 accordingly. Using the instrument 120 and adjusting the ultrasound pressure of the apparatus 146 is advantageous to conduct the X-ray diffraction experiments on the small crystals in said sample holder with the minimal positional fluctuation of the dose per crystal.

The invention claimed is:

1. A device for growing crystals of molecules from a crystallization medium containing the molecules in droplets held by a plurality of sample holders, the device comprising:
   a) a plurality of independent cells provided by an array of wells and a top plate and a bottom plate thereby forming volumes for the plurality of sample holders; each of said wells being formed to host a sample holder of the plurality of sample holders between said top plate and said bottom plate and at least one of said top plate or bottom plate is formed with openings equipped with removable caps;
   b) said plurality of independent cells made up of stacks of independent cells formed by said top plate, at least one sample holder frame, said bottom plate, and spacer layers;
   c) spacer bars around said sample holder that are connected to said at least one sample holder frame, wherein each of said wells is adapted to be in equilibrium with a vapor of a solution in a space above and below said sample holder through the openings between said sample holder and said at least one sample holder frame;
   d) wherein a volume of each well is adjustable by a thickness of said caps selected for a respective said well;
   e) said top plate, said bottom plate, said caps, and said spacer layers being formed of waterproof material and said sample holder being formed as a thin plate configured to reduce X-ray scattering.

2. The device according to claim 1, wherein said sample holder is formed of polyimide or fluorinated polyimide having a thickness in a range from 5 to 50 μm.

3. The device according to claim 1, wherein the crystallization medium is a solution.

4. The device according to claim 1, wherein each sample holder comprises upper and lower thin plates adapted to grow the crystals of molecules from a solution by way of a sandwich crystallization method, and wherein:
   a) said sample holder frames are split into an upper sample holder frame and a lower sample holder frame wherein said spacer bars around said upper thin plate of said sample holder are connected to said upper sample holder frame and said spacer bars around said lower thin plate of said sample holder are connected to said lower sample holder frame; and
   b) all of said upper thin plates of said sample holders are connected to said upper sample holder frame via said spacer bars around said sample holders as one layer, and all of said lower thin plates of said sample holders are connected to said lower sample holder frame via said spacer bars around said sample holders as one layer.

5. The device according to claim 4, wherein a surface of said thin-plates of said sample holders is formed with a recess volume.

6. The device according to claim 5, wherein said recess volumes extend into a surface of said spacer bars of said sample holders.

7. The device according to claim 4, which comprises adhesives placed at an edge of said thin-plates.

8. The device according to claim 7, wherein said adhesives are connected to said spacer bars.

9. The device according to claim 4, wherein said thin-plates of said sample holders have edges patterned with protrusions and/or grooves on the side of the surface facing the solution to decrease an evaporation of the solution.

10. A system for conducting automated serial crystallography experiments of crystals at room temperature to collect X-ray diffraction images resolving a structure of the crystals at atomic resolution, the system comprising:
 a) an acoustic levitation diffractometer including an acoustic levitator, an X-ray source, and an X-ray image detector;
 b) a device according to claim 1, said device having samples of the crystals in the plurality of sample holders;
 c) a gonio stage configured to rotate an axis of said acoustic levitator to an oblique angle with respect to an X-ray beam generated by said X-ray source,
 d) a translation stage configured to move said acoustic levitator of said acoustic levitation diffractometer in a transverse direction perpendicular to the X-ray beam and the axis of said acoustic levitator,
 e) a mechanism configured to harvest the sample holders from said device,
 f) wherein a spiral trajectory of a spot of the X-ray beam on said sample holder during data collection is achieved by a combination of a rotation of the acoustically levitated sample holder in said acoustic levitator and a simultaneous transverse translation of the sample holder with said acoustic levitator; the ultrasonic acoustic pressure of said acoustic levitator is adjusted to set a rotation speed of the sample holder acoustically levitated in said acoustic levitator with the axis oblique to the X-ray beam and wherein a transverse translation velocity is set accordingly to adjust a radial separation between the spiral trajectory of the spot of the X-ray beam on the sample holder with an appropriate X-ray dose on sample crystals at a given X-ray photon flux.

11. The system according to claim 10, wherein a radial separation between the spiral trajectories lies in a range of 10 to 20 microns for crystals of a size in a range from 5 to 100 microns, with a crystal hit rate with one crystal for each diffraction image, said radial separation being set when the ultrasound acoustic pressure of −0.5 kPa is applied to rotate the sample holder at ~2 rps and the transverse translation velocity of said transverse translation stage is set to ~0.2 mm/s.

12. The system according to claim 11, wherein the radial separation between the spiral trajectories lies in the range of 10 to 20 microns for conducting the serial crystallography experiments for crystals having a size of 20 microns or smaller.

13. The system according to claim 10, wherein the ultrasound acoustic pressure and the rotation speed, the transverse translation velocity, and the frame rate of the high-frame-rate X-ray image detector are adjusted to values of a pre-determined data collection efficiency and a signal-to-noise ratio of the dataset while limiting a maximum dose of the X-ray on the crystal sample to $10-10^3$ kGy per crystal at a given X-ray photon flux.

14. The system according to claim 10, wherein a photon flux of the x-ray beam is adjusted to enable protein crystallography experiments.

15. The system according to claim 10, which comprises an apparatus disposed to exert a force on the sample holders to control the rotation of the sample holder around the axis perpendicular to a plane of the thin plates of the sample holders, wherein the force is produced by a narrow air flow or the force is an acoustic radiation force induced by an ultrasound propagating wave or ultrasound standing wave of a constant pressure or a modulated pressure in terms of an amplitude or a frequency of the ultrasonic wave or pulse-modulated in a direction transverse to the direction of the axis of said acoustic levitator and the direction of the X-ray beam.

* * * * *